United States Patent
De Sousa Duarte et al.

(10) Patent No.: US 12,344,805 B2
(45) Date of Patent: Jul. 1, 2025

(54) PROCESS FOR THE SIMULTANEOUS PROCESSING OF PLASTICS PYROLYSIS OILS AND OF A FEEDSTOCK ORIGINATING FROM RENEWABLE RESOURCES

(71) Applicant: IFP ENERGIES NOUVELLES, Rueil-Malmaison (FR)

(72) Inventors: Marisa De Sousa Duarte, Rueil-Malmaison (FR); Dominique Decottignies, Rueil-Malmaison (FR); Vincent Souchon, Rueil-Malmaison (FR); Wilfried Weiss, Rueil-Malmaison (FR); Jérôme Bonnardot, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 18/559,011

(22) PCT Filed: Apr. 28, 2022

(86) PCT No.: PCT/EP2022/061287
§ 371 (c)(1),
(2) Date: Nov. 3, 2023

(87) PCT Pub. No.: WO2022/233688
PCT Pub. Date: Nov. 10, 2022

(65) Prior Publication Data
US 2024/0240090 A1     Jul. 18, 2024

(30) Foreign Application Priority Data
May 7, 2021  (FR) ...................... 2104874

(51) Int. Cl.
C10G 65/12   (2006.01)
C10G 1/00    (2006.01)
C10G 1/10    (2006.01)

(52) U.S. Cl.
CPC ............ *C10G 65/12* (2013.01); *C10G 1/002* (2013.01); *C10G 1/10* (2013.01);
(Continued)

(58) Field of Classification Search
None
See application file for complete search history.

(56) References Cited

U.S. PATENT DOCUMENTS

| 4,498,972 A | 2/1985 | Toulhoat et al. |
| 4,510,042 A | 4/1985 | Billon et al. |

(Continued)

FOREIGN PATENT DOCUMENTS

WO   WO-2014001632 A1 *   1/2014   ............. C10B 53/02

OTHER PUBLICATIONS

International Search Report PCT/EP2022/061287 dated Jun. 17, 2022 (pp. 1-4).

*Primary Examiner* — In Suk C Bullock
*Assistant Examiner* — Alyssa L Cepluch
(74) *Attorney, Agent, or Firm* — Millen, White, Zelano & Branigan, P.C.; Brion P. Heaney

(57) ABSTRACT

The invention relates to a process for treating a feedstock comprising a plastics pyrolysis oil and a feedstock derived from renewable sources, comprising:
  a) optionally, a step of selective hydrogenation of the feedstock comprising a plastics pyrolysis oil,
  b) a hydrodemetallization of the feedstock comprising a plastics pyrolysis oil or of the effluent of step a),
  c) a hydrotreatment of said effluent obtained from step b), and in which said feedstock derived from renewable sources is introduced in step a) and/or in step b) and/or in step c),
  the weight ratio between the flow rate of the feedstock comprising the plastics pyrolysis oil and the flow rate of feedstock derived from renewable sources introduced being between 0.05 and 20,
  d) a separation in the presence of an aqueous stream.

19 Claims, 1 Drawing Sheet

(52) U.S. Cl.
CPC .............. *C10G 2300/1014* (2013.01); *C10G 2300/1018* (2013.01); *C10G 2300/205* (2013.01); *C10G 2300/301* (2013.01); *C10G 2300/4006* (2013.01); *C10G 2300/4012* (2013.01); *C10G 2300/4018* (2013.01)

(56) References Cited

U.S. PATENT DOCUMENTS

| | | |
|---|---|---|
| 4,818,743 A | 4/1989 | Simpson et al. |
| 5,089,463 A | 2/1992 | Johnson |
| 5,221,656 A | 6/1993 | Clark et al. |
| 5,622,616 A | 4/1997 | Porter et al. |
| 5,827,421 A | 10/1998 | Sherwood, Jr. |
| 5,904,838 A * | 5/1999 | Kalnes .................. C10G 65/04 208/143 |
| 6,332,976 B1 | 12/2001 | Mignard et al. |
| 6,589,908 B1 | 7/2003 | Ginestra et al. |
| 7,119,045 B2 | 10/2006 | Magna et al. |
| 9,062,258 B2 | 6/2015 | Mayeur et al. |
| 9,109,168 B2 | 8/2015 | Dupassieux et al. |
| 10,843,158 B2 | 11/2020 | Plais et al. |
| 2007/0080099 A1 | 4/2007 | Reid et al. |
| 2009/0253947 A1* | 10/2009 | Brandvold ............. C10G 65/00 585/14 |
| 2016/0362609 A1 | 12/2016 | Ward et al. |
| 2017/0218288 A1* | 8/2017 | Vauhkonen .............. C10G 3/42 |
| 2019/0161683 A1* | 5/2019 | Narayanaswamy ... C10G 69/14 |

* cited by examiner

PROCESS FOR THE SIMULTANEOUS PROCESSING OF PLASTICS PYROLYSIS OILS AND OF A FEEDSTOCK ORIGINATING FROM RENEWABLE RESOURCES

TECHNICAL FIELD

The present invention relates to a process for simultaneously treating a plastics pyrolysis oil and a feedstock derived from renewable sources in order to obtain a hydrocarbon-based effluent which may be upgraded by being incorporated directly into a naphtha or diesel pool or as feedstock for a steam cracking unit. More particularly, the present invention relates to a process for simultaneously treating a feedstock derived from the pyrolysis of plastic waste and a feedstock derived from renewable sources in order to at least partly remove impurities that these feedstocks may contain in relatively high amounts.

PRIOR ART

Plastics obtained from collection and sorting channels may undergo a step of pyrolysis so as to obtain, inter alia, pyrolysis oils. These plastics pyrolysis oils are generally burnt to generate electricity and/or used as fuel in industrial boilers or urban heating.

Another route for upgrading plastics pyrolysis oils is the use of these plastics pyrolysis oils as feedstock for a steam cracking unit so as to (re)create olefins, said olefins being constituent monomers of certain polymers. However, plastic waste is generally mixtures of several polymers, for example mixtures of polyethylene, polypropylene, polyethylene terephthalate, polyvinyl chloride and polystyrene. Furthermore, depending on the applications, the plastics may contain, in addition to polymers, other compounds, such as plasticizers, pigments, dyes or polymerization catalyst residues. Plastic waste may also contain, in a minor amount, renewable sources originating, for example, from household waste. The treatment of waste, on the one hand, notably, storage, mechanical treatments, sorting, pyrolysis, and also, on the other hand, the storage and transport of pyrolysis oil can also cause corrosion. As a result, the oils obtained from the pyrolysis of plastic waste comprise a lot of impurities, in particular diolefins, metals, metalloids, notably iron, silicon, or halogenated compounds, notably chlorine-based compounds, heteroelements such as sulfur, oxygen and nitrogen, and insoluble matter, in contents that are often high and incompatible with steam cracking units or units located downstream of the steam cracking units, notably polymerization processes and selective hydrogenation processes. These impurities may give rise to operability problems and notably problems of corrosion, coking or catalytic deactivation, or alternatively incompatibility problems in the applications of the target polymers. The presence of diolefins may also lead to problems of instability of the pyrolysis oil, characterized by the formation of gums. The gums and the insoluble matter which may be present in pyrolysis oil can give rise to problems of clogging in the processes.

Furthermore, during the steam cracking step, the yields of light olefins sought for petrochemistry, notably ethylene and propylene, depend greatly on the quality of the feedstocks sent for steam cracking. The BMCI (Bureau of Mines Correlation Index) is often used to characterize hydrocarbon cuts. This index, developed for hydrocarbon-based products derived from crude oils, is calculated from the measurement of the density and the average boiling point: it is equal to 0 for a linear paraffin and to 100 for benzene. Its value is therefore all the higher if the product analysed has an aromatic condensed structure, naphthenes having an intermediate BMCI between paraffins and aromatics. Overall, the yields of light olefins increase when the paraffin content increases and therefore when the BMCI decreases. Conversely, the yields of undesired heavy compounds and/or of coke increase when the BMCI increases.

The integration into the refining process of new products of plant origin, derived from the conversion of lignocellulosic renewable sources or derived from the production of plant oils or animal fats, has over the past few decades experienced a very considerable revival of interest owing to the increase in the cost of fossil materials and the desire to reduce the transportation carbon footprint. Thus, numerous biofuels (mainly ethanol, methyl esters of plant oils, hydrotreated plant oils) have gained real status as supplements for petroleum bases in fuel pools.

The hydrotreating of triglycerides and fatty acids derived from feedstocks of biological and/or animal origin makes it possible to obtain long paraffins which can optionally be hydroisomerized with a view to them being incorporated in fuel pools of jet fuel or diesel type The rapid electrification of land-based transport vehicles could however limit the recourse to feedstocks of biological origin in the coming years. There is therefore an advantage to finding new ways to upgrade.

WO 2018/055555 proposes an overall process for recycling plastic waste, which is very general and relatively complex, ranging from the very step of pyrolysis of the plastic waste up to the steam cracking step. The process of application WO 2018/055555 comprises, inter alia, a step of hydrotreating the liquid phase obtained directly from the pyrolysis, preferably under quite stringent conditions notably in terms of temperature, for example at a temperature of between 260 and 300° C., a step of separation of the hydrotreatment effluent and then a step of hydrodealkylation of the heavy effluent separated out, preferably at a high temperature, for example between 260 and 400° C.

The unpublished patent application FR 20/01758 describes a process for treating a plastics pyrolysis oil, comprising:
a) selective hydrogenation of said feedstock in the presence of hydrogen and of a selective hydrogenation catalyst to obtain a hydrogenated effluent;
b) hydrotreatment of said hydrogenated effluent in the presence of hydrogen and of a hydrotreatment catalyst, to obtain a hydrotreatment effluent;
c) separation of the hydrotreatment effluent in the presence of an aqueous stream, at a temperature of between 50 and 370° C., to obtain a gaseous effluent, an aqueous liquid effluent and a hydrocarbon-based liquid effluent;
d) optionally, a step of fractionation of all or part of the hydrocarbon-based effluent obtained from step c), to obtain a gas stream and at least two hydrocarbon-based streams which may be a naphtha cut and a heavier cut;
e) a recycling step comprising a phase of recovering a fraction of the hydrocarbon-based effluent obtained from the separation step c) or a fraction of and/or at least one of the hydrocarbon-based streams obtained from the fractionation step d), into the selective hydrogenation step a) and/or the hydrotreatment step b).

Document FR2910017 proposes a process for treating a petroleum-based feedstock and a feedstock of biological origin in which the petroleum-based feedstock is injected into a catalytic section located upstream of the point of injection of the feedstock of biological origin. The solution proposed in document FR2910017 does not make it possible to treat a plastics pyrolysis oil in a mixture with a feedstock of biological origin.

Thus, the simultaneous treatment of a plastics pyrolysis oil and of a feedstock derived from renewable sources allows optimized treatment of the two feedstocks by efficiently treating the impurities present and by converting the feedstocks into upgradable products. These products can notably be used as steam-cracking unit feedstocks for the purpose of producing olefins which, after polymerization, will make it possible to obtain not only polymers that have been recycled owing to the plastic origin of the pyrolysis oil, but also polymers with a reduced environmental impact owing to the biological origin. These products can also be upgraded as a base in fuel pools.

SUMMARY OF THE INVENTION

The invention relates to a process for treating a feedstock comprising a plastics pyrolysis oil and a feedstock derived from renewable sources, comprising:
- a) optionally, a selective hydrogenation step performed in a reaction section fed at least with said feedstock comprising a plastics pyrolysis oil and a gas stream comprising hydrogen, in the presence of at least one selective hydrogenation catalyst, at a temperature of between 80 and 280° C., a partial pressure of hydrogen of between 1.0 and 20.0 MPa abs., and an hourly space velocity of between 0.3 and 10.0 $h^{-1}$, to obtain a hydrogenated effluent,
- b) a hydrodemetallization step performed in a hydrodemetallization reaction section comprising at least one hydrodemetallization catalyst, said hydrodemetallization reaction section being fed at least with a feedstock comprising a plastics pyrolysis oil and/or the hydrogenated effluent obtained from step a), and a gas stream comprising hydrogen, said hydrodemetallization reaction section being performed at an average temperature of between 140 and 400° C., a partial pressure of hydrogen of between 1.0 and 20.0 MPa abs., and an hourly space velocity of between 0.1 and 10.0 $h^{-1}$, to obtain a demetallized effluent,
- c) a hydrotreatment step performed in a hydrotreatment reaction section comprising at least one hydrotreatment catalyst, said hydrotreatment reaction section being fed at least with said demetallized effluent obtained from step b) and a gas stream comprising hydrogen, said hydrotreatment reaction section being used at a temperature of between 250 and 450° C., a partial pressure of hydrogen of between 1.0 and 10.0 MPa abs., and an hourly space velocity of between 0.1 and 10.0 $h^{-1}$, to obtain a hydrotreated effluent;
and in which said feedstock derived from renewable sources is introduced optionally as a mixture with said feedstock comprising a plastics pyrolysis oil in step a) and/or in step b) and/or in step c),
the weight ratio between the flow rate of feedstock comprising the plastics pyrolysis oil and the flow rate of feedstock derived from renewable sources introduced being between 0.05 and 20,
- c') optionally, a hydrocracking step performed in a hydrocracking reaction section comprising at least one hydrocracking catalyst, said hydrocracking reaction section being fed at least with said hydrotreated effluent obtained from step c) and/or with the cut comprising compounds having a boiling point greater than 175° C. obtained from step e) and a gas stream comprising hydrogen, said hydrocracking reaction section being used at an average temperature of between 250 and 450° C., a partial pressure of hydrogen of between 1.5 and 20.0 MPa abs., and an hourly space velocity of between 0.1 and 10.0 $h^{-1}$, to obtain a hydrocracked effluent which is sent into the separation step d),
- d) a separation step, fed with the hydrotreated effluent obtained from step c) and/or with the hydrocracked effluent obtained from step c') and an aqueous solution, said step being performed at a temperature of between 50 and 450° C., to obtain at least one gaseous effluent, an aqueous effluent and a hydrocarbon-based effluent,
- e) optionally a step of fractionating all or a part of the hydrocarbon-based effluent obtained from step d), to obtain at least one gaseous effluent and at least one cut comprising compounds with a boiling point of less than or equal to 175° C. and one hydrocarbon cut comprising compounds with a boiling point of greater than 175° C.

One advantage of the process according to the invention is that of simultaneously purifying a feedstock comprising an oil obtained from the pyrolysis of plastic waste and a feedstock derived from renewable sources in order to at least partly remove impurities and to hydrogenate these feedstocks and thus to be able to upgrade the products obtained, in particular by incorporating them directly into a fuel pool and/or by making them compatible with a treatment in a steam cracking unit in order to be able to obtain in particular light olefins with increased yields, which may be used as monomers in the manufacture of polymers.

The process according to the invention stands out notably by virtue of a great flexibility making it possible to introduce the feedstock derived from renewable resources according to its impurities in various steps of the process. Indeed, when the feedstock derived from renewable resources contains many impurities, it can be partly or totally introduced in step a) and/or step b). When such a treatment is not necessary, the feedstock derived from renewable resources can also be partly or totally introduced in step c).

Another advantage of the invention is that of limiting the increase in temperature between the inlet and the outlet of a plug flow reactor, for example a fixed bed, induced in particular by the heat given off by the hydrotreatment of the feedstock derived from renewable sources, this heat being partly absorbed by the plastics pyrolysis oil which is simultaneously treated. This results in an optimized process which limits the significant recourse to the recycling of effluent and/or to gaseous and/or liquid cooling streams.

The process of the invention thus makes it possible to obtain a hydrocarbon-based effluent obtained from a plastics pyrolysis oil and from a feedstock derived from renewable sources, and from which the starting impurities have at least partly been removed, thus limiting the problems of operability, such as the corrosion, coking or catalytic deactivation problems, to which these impurities may give rise, in particular in steam cracking units and/or in units located downstream of the steam cracking units, notably the polymerization and hydrogenation units. The removal of at least a part of the impurities from the oils obtained from the pyrolysis of plastic waste and from the feedstocks derived from renewable sources will also make it possible to increase the range of applications of the target polymers, the application incompatibilities being reduced.

According to one variant, the process according to the invention comprises the fractionation step e).

According to one variant, the process according to the invention comprises hydrocracking step c').

According to one variant, the process according to the invention comprises said selective hydrogenation step a).

According to one variant, the feedstock derived from renewable sources is a feedstock comprising an oil and/or fat of plant and/or animal origin.

According to one variant, at least a part of the feedstock derived from renewable resources is introduced in step c).

According to one variant, the temperature of the reaction section of step c) is higher than the temperature of the hydrodemetallization reaction section of step b).

According to one variant, at least one fraction of the hydrocarbon-based effluent obtained from the separation step d) or at least one fraction of the naphtha cut comprising compounds with a boiling point of less than or equal to 175° C. obtained from the fractionation step e) is sent, as recycle stream, to the selective hydrogenation step a) and/or the hydrodemetallization step b) and/or the hydrotreatment step c).

According to one variant, at least one fraction of the cut comprising compounds with a boiling point of greater than 175° C. obtained from the fractionation step e) is sent, as recycle stream, to the hydrodemetallization step b) and/or the hydrotreatment step c) and/or the hydrocracking step c').

According to one variant, the weight ratio between the recycle stream and the feedstock comprising a plastics pyrolysis oil and a feedstock from renewable sources is less than or equal to 10.

According to one variant, the process according to the invention comprises a step a0) of pretreating the feedstock, said pretreatment step being carried out upstream of the selective hydrogenation step a) and comprising a filtration step and/or an electrostatic separation step and/or a step of washing by means of an aqueous solution and/or an adsorption step.

According to one variant, the hydrocarbon-based effluent obtained from the separation step d), or at least one of the two liquid hydrocarbon-based streams obtained from step e), is totally or partly sent to a steam cracking step f) carried out in at least one pyrolysis furnace at a temperature of between 700 and 900° C. and at a pressure of between 0.05 and 0.3 MPa relative.

According to one variant, said selective hydrogenation catalyst comprises a support chosen from alumina, silica, silica-aluminas, magnesia, clays and mixtures thereof and a hydro-dehydrogenating function comprising either at least one group VIII element and at least one group VIB element, or at least one group VIII element.

According to one variant, said hydrodemetallization catalyst and said hydrotreatment catalyst comprise a support chosen from the group consisting of alumina, silica, silica-aluminas, magnesia, clays and mixtures thereof and a hydro-dehydrogenating function comprising at least one group VIII element and/or at least one group VIB element.

According to one variant, the process according to the invention also comprises a second hydrocracking step c") performed in a hydrocracking reaction section comprising at least one hydrocracking catalyst, said hydrocracking reaction section being fed with the cut comprising compounds having a boiling point greater than 175° C. obtained from step e) and a gas stream comprising hydrogen, said hydrocracking reaction section being used at a temperature of between 250 and 450° C., a partial pressure of hydrogen of between 1.5 and 20.0 MPa abs., and an hourly space velocity of between 0.1 and 10.0 $h^{-1}$, to obtain a hydrocracked effluent which is sent into the separation step d).

According to one variant, said hydrocracking catalyst comprises a support chosen from halogenated aluminas, combinations of boron and aluminium oxides, amorphous silica-aluminas and zeolites and a hydro-dehydrogenating function comprising at least one group VIB metal chosen from chromium, molybdenum and tungsten, alone or as a mixture, and/or at least one group VIII metal chosen from iron, cobalt, nickel, ruthenium, rhodium, palladium and platinum.

According to one variant, the feedstock has the following properties:
  a content of aromatic compounds of between 0 and 90% by weight,
  a content of halogenated compounds of between 2 and 5000 ppm by weight,
  a content of metallic elements of between 10 and 10 000 ppm by weight,
  including a content of iron element of between 0 and 100 ppm by weight,
  a content of silicon element of between 0 and 1000 ppm by weight.

The invention also relates to the product which may be obtained via the treatment process according to the invention.

According to one variant, the product comprises, relative to the total weight of the product:
  a total content of metallic elements of less than or equal to 5.0 ppm by weight,
  with a content of iron element of less than or equal to 100 ppb by weight,
  a content of silicon element of less than or equal to 1.0 ppm by weight,
  a sulfur content of less than or equal to 500 ppm by weight,
  a nitrogen content of less than or equal to 100 ppm by weight,
  a content of chlorine element of less than or equal to 10 ppm by weight.

According to the present invention, the pressures are absolute pressures, also written as abs., and are given in MPa absolute (or MPa abs.), unless otherwise indicated.

According to the present invention, the expressions "comprised between . . . and . . . " and "between . . . and . . . " are equivalent and mean that the limit values of the interval are included in the described range of values. If such were not the case and if the limit values were not included in the described range, such a clarification will be given by the present invention.

For the purposes of the present invention, the various ranges of parameters for a given step, such as the pressure ranges and the temperature ranges, can be used alone or in combination. For example, for the purposes of the present invention, a range of preferred pressure values can be combined with a range of more preferred temperature values.

In the text hereinbelow, particular and/or preferred embodiments of the invention may be described. They may be implemented separately or combined together without limitation of combination when this is technically feasible.

Subsequently, the groups of chemical elements are given according to the CAS classification (CRC Handbook of Chemistry and Physics, published by CRC Press, editor-in-chief D. R. Lide, 81st edition, 2000-2001). For example, Group VIII according to the CAS classification corresponds to the metals of Columns 8, 9 and 10 according to the new IUPAC classification. The content of metals is measured by X-ray fluorescence.

DETAILED DESCRIPTION

The Feedstock

According to the invention, the feedstock treated in the process according to the invention is a feedstock comprising a plastics pyrolysis oil and a feedstock derived from renewable sources.

The "plastics pyrolysis oil" is an oil derived from the pyrolysis of plastics, preferably of plastic waste originating in particular from collecting and sorting industries. It comprises in particular a mixture of hydrocarbon-based compounds, notably paraffins, mono- and/or diolefins, naphthenes and aromatics. At least 80% by weight of these hydrocarbon-based compounds preferably have a boiling point of less than 700° C., and preferably less than 550° C. In particular, depending on the origin of the pyrolysis oil, said oil comprises up to 70% by weight of paraffins, up to 90% by weight of olefins and up to 90% by weight of aromatics, it being understood that the sum of the paraffins, of the olefins and of the aromatics is 100% by weight of the hydrocarbon-based compounds.

The density of the pyrolysis oil, measured at 15° C. according to the ASTM D4052 method, is generally between 0.75 and 0.99 g/cm$^3$, preferably between 0.75 and 0.95 g/cm$^3$.

The plastics pyrolysis oil can additionally comprise, and usually does comprise, impurities such as metals, notably iron, silicon, or halogenated compounds, notably chlorinated compounds. These impurities may be present in the plastics pyrolysis oils in high contents, for example up to 350 ppm by weight or even 700 ppm by weight or even 1000 ppm by weight of halogen elements (notably chlorine) provided by halogenated compounds, up to 100 ppm by weight, or even 200 ppm by weight of metallic or semi-metallic elements. Alkali metals, alkaline-earth metals, transition metals, post-transition metals and metalloids may be likened to contaminants of metallic nature, referred to as metals or metallic or semi-metallic elements. In particular, the metals or metallic or semi-metallic elements which may be contained in the oils obtained from the pyrolysis of plastic waste comprise silicon, iron or both of these elements. The plastics pyrolysis oil may also comprise other impurities such as heteroelements provided notably by sulfur compounds, oxygen compounds and/or nitrogen compounds, in contents generally less than 10 000 ppm by weight of heteroelements and preferably less than 4000 ppm by weight of heteroelements.

The plastics pyrolysis oil may be obtained from a thermal, catalytic pyrolysis treatment or else may be prepared by hydropyrolysis (pyrolysis in the presence of a catalyst and of hydrogen).

The feedstock treated in the process according to the invention also comprises a feedstock derived from renewable sources.

According to a first variant, the feedstock derived from renewable sources is advantageously chosen from an oil or fat of plant and/or animal origin. The oil or fat of plant and/or animal origin used in the present invention contains triglycerides and/or free fatty acids and/or esters. The plant oils may advantageously be crude or totally or partially refined, and derived from the following plants: rapeseed, sunflower, soya, palm, palm kernel, olive, coconut, jatropha, this list not being limiting. Algal oils or fish oils are also relevant. The animal fats are advantageously chosen from lard or fats composed of residues from the food industry or derived from the catering industries.

These feedstocks essentially contain chemical structures of triglyceride type that those skilled in the art also know as fatty acid triester and/or free fatty acids. A fatty acid triester is thus composed of three fatty acid chains. These fatty acid chains in triester form or in free fatty acid form have a number of unsaturations per chain, also known as a number of carbon-carbon double bonds per chain, generally between 0 and 3, but which may be higher in particular for oils derived from algae which generally have from 5 to 6 unsaturations per chain.

The molecules present in the feedstocks comprising an oil or fat or plant and/or animal origin that are used in the present invention therefore have a number of unsaturations per molecule advantageously of between 0 and 18. In these feedstocks, the ratio between the sum of the number of unsaturations of all the molecules and the number of molecules is advantageously between 0 and 6.

According to a second variant, the feedstock derived from renewable sources is advantageously chosen from feedstocks originating from processes for thermal and/or catalytic conversion of lignocellulosic biomass, such as oils which are produced from lignocellulosic biomass, with various liquefaction methods, such as hydrothermal liquefaction or pyrolysis. The term "biomass" refers to a material derived from recently living organisms, which comprises plants, animals and by-products thereof. The term "lignocellulosic biomass" denotes renewable sources derived from plants or from by-products thereof. The lignocellulosic renewable sources are composed of carbohydrate polymers (cellulose, hemicellulose) and of an aromatic polymer (lignin).

These feedstocks derived from renewable sources may be crude, refined or semi-refined and they also contain impurities, notably phospholipids, alkali metals, alkaline-earth metals, notably iron, phosphorus, sodium, calcium, magnesium.

Preferably, the feedstock derived from renewable sources is a feedstock comprising an oil or fat of plant and/or animal origin.

The feedstock of the process according to the invention comprises at least one plastics pyrolysis oil and at least one feedstock derived from renewable sources. Said feedstock may consist solely of plastics pyrolysis oil(s) and of feedstock(s) derived from renewable sources. Preferably, said feedstock comprises at least 50% by weight, preferably between 75% and 100% by weight, of plastics pyrolysis oil(s) and of feedstock(s) derived from renewable sources, that is to say preferably between 50% and 100% by weight, preferably between 70% and 100% by weight, of plastics pyrolysis oil and of feedstock(s) derived from renewable sources.

The weight ratio between the flow rate of feedstock comprising the plastics pyrolysis oil and the flow rate of feedstock(s) derived from renewable sources introduced into the process according to the invention is generally between 0.02 and 50, usually between 0.05 and 20, and preferably between 0.1 and 10. This term "weight ratio" is intended to mean the total weight ratio introduced into the process according to the invention, regardless of the step in which the feedstock derived from renewable sources is introduced.

The feedstock of the process according to the invention may also comprise a conventional petroleum-based feedstock which is then co-treated with the plastics pyrolysis oil and the feedstock derived from renewable sources. The conventional petroleum-based feedstock can advantageously be a cut or a mixture of cuts of the type naphtha, gas oil or gas oil under vacuum. In this case, the petroleum-based feedstock can be injected in steps a) and/or b) and/or c) and/or c'), and preferably in step c).

Pretreatment (Optional)

Said feedstock comprising a plastics pyrolysis oil and/or a feedstock derived from renewable resources may advantageously be pretreated in an optional pretreatment step a0), prior to the selective hydrogenation step a), to obtain at least one pretreated feedstock which feeds step a) or step b).

The feedstock pretreated in the optional step a0) may notably comprise:
- a mixture of plastics pyrolysis oil and of feedstock derived from renewable sources,
- a feedstock comprising a plastics pyrolysis oil without feedstock derived from renewable sources,
- a feedstock derived from renewable sources without plastics pyrolysis oil,
- two distinct streams, one of which comprises a plastics pyrolysis oil and the other of which comprises the feedstock derived from renewable sources, these two streams being treated in parallel in the pretreatment step a0) under different processing conditions and operations.

When the feedstock pretreated in the optional step a0) is a feedstock comprising a plastics pyrolysis oil without feedstock derived from renewable sources, the feedstock derived from renewable sources can be introduced in step a) and/or in step b) and/or in step c), whereas the pretreated feedstock comprising a plastics pyrolysis oil is introduced in the optional step a) or in step b).

When the feedstock pretreated in the optional step a0) is a feedstock derived from renewable sources without plastics pyrolysis oil, the feedstock comprising a plastics pyrolysis oil can be introduced in the optional step a) or in step b), whereas the pretreated feedstock derived from renewable sources can be introduced in step a) and/or in step b) and/or in step c).

This optional pretreatment step a0) makes it possible to reduce the amount of contaminants, in particular the amount of iron and/or of silicon and/or of chlorine and/or phosphorus and/or sodium and/or of calcium, possibly present in the feedstock comprising a plastics pyrolysis oil and/or in the feedstock derived from renewable sources. Thus, an optional step a0) of pretreatment of the feedstock comprising a plastics pyrolysis oil and/or the feedstock derived from renewable sources is advantageously performed in particular when said feedstock comprises more than 10 ppm by weight, notably more than 20 ppm by weight, more particularly more than 50 ppm by weight of metallic elements, and in particular when said feedstock comprises more than 5 ppm by weight of silicon, more particularly more than 10 ppm by weight, or even more than 20 ppm by weight of silicon. Likewise, an optional pretreatment step a0) is advantageously carried out in particular when said feedstock comprises more than 10 ppm by weight, notably more than 20 ppm by weight, more particularly more than 50 ppm by weight of chlorine. Likewise, an optional pretreatment step a0) is advantageously carried out in particular when said feedstock comprises more than 100 ppm by weight, notably more than 200 ppm by weight, more particularly more than 500 ppm by weight of phosphorus. Likewise, an optional step a0) of pretreatment of the feedstock is advantageously carried out in particular when said feedstock comprises acidic species resulting in a TAN (Total Acid Number) value of greater than 1 mg of KOH/g, or even greater than 3 mg of KOH/g, or even greater than 6 mg of KOH/g.

Said optional pretreatment step a0) may be performed via any method known to those skilled in the art for reducing the amount of contaminants. It may notably comprise a filtration step and/or an electrostatic separation step and/or a step of washing by means of an aqueous solution and/or an adsorption step.

Said optional pre-treatment step a0) is advantageously performed at a temperature of between 0 and 150° C., preferably between 5 and 100° C., and at a pressure of between 0.15 and 10.0 MPa abs, preferably between 0.2 and 1.0 MPa abs.

According to one variant, said optional pre-treatment step a0) is performed in an adsorption section operated in the presence of at least one adsorbent, preferably of alumina type, having a specific surface area greater than or equal to 100 $m^2/g$, preferably greater than or equal to 200 $m^2/g$. The specific surface area of said at least one adsorbent is advantageously less than or equal to 600 $m^2/g$, in particular less than or equal to 400 $m^2/g$. The specific surface area of the adsorbent is a surface area measured by the BET method, i.e. the specific surface area determined by nitrogen adsorption in accordance with the standard ASTM D 3663-78 established from the Brunauer-Emmett-Teller method described in the periodical *The Journal of the American Chemical Society*, 60, 309 (1938).

Advantageously, said adsorbent comprises less than 1% by weight of metallic elements, and is preferably free of metallic elements. The term "metallic elements of the adsorbent" should be understood as referring to the elements from groups 6 to 10 of the Periodic Table of the Elements (new IUPAC classification). The residence time of the feedstock in the adsorbent section is generally between 1 and 180 minutes.

Said adsorption section of the optional step a0) comprises at least one adsorption column, preferably comprises at least two adsorption columns, preferentially between two and four adsorption columns, containing said adsorbent. When the adsorption section comprises two adsorption columns, one operating mode may be that referred to as "swing" operating according to the dedicated terminology, in which one of the columns is on-line, i.e. in service, while the other column is in reserve. When the absorbent of the on-line column is spent, this column is isolated, while the column in reserve is placed on-line, i.e. in service. The spent absorbent can then be regenerated in situ and/or replaced with fresh absorbent so that the column containing it can once again be placed on-line once the other column has been isolated.

Another operating mode is to have at least two columns operating in series. When the absorbent of the column placed at the head is spent, this first column is isolated and the spent adsorbent is either regenerated in situ or replaced with fresh adsorbent. The column is then brought back on-line in the last position, and so on. This operating mode is known as the permutable mode, or as PRS for permutable reactor system or else "lead and lag" according to the dedicated terminology. The combination of at least two adsorption columns makes it possible to overcome the possible and potentially rapid poisoning and/or clogging of the adsorbent due to the combined action of the metallic contaminants, of the diolefins, of the gums obtained from the diolefins, of the phosphorus, of the sodium, of the calcium and of the insoluble matter which may be present in said feedstock to be treated. The reason for this is that the presence of at least two adsorption columns facilitates the replacement and/or regeneration of the adsorbent, advantageously without stoppage of the pretreatment unit, or even of the process, thus making it possible to reduce the risks of clogging and thus to avoid stoppage of the unit due to clogging, to control the costs and to limit the consumption of adsorbent.

According to another variant, said optional pre-treatment step a0) is carried out in a washing section by bringing the feedstock into contact with at least one washing liquid which may be an organic solvent or an aqueous solution or an aqueous solution comprising organic compounds. Preferably, the washing liquid is an aqueous solution which may be for example water, preferably demineralized and aerated water, or an acidic or basic solution. This washing section can contain devices for bringing the feedstock into contact with the washing liquid and for separating the phases so as to obtain, on the one hand, the pretreated feedstock and, on the other hand, the washing liquid comprising impurities. Among these devices, there may for example be a stirred reactor, a decanter, a mixer-decanter, a cocurrent or countercurrent washing column. Advantageously, the washing column is a packed column, a plate, a stirred column or a pulsed column; the ratio between the amount of washing liquid and amount of feedstock being between 0.01 and 100, preferably between 0.1 and 10 and preferably between 0.15 and 2.

Said optional pretreatment step a0) may also optionally be fed with at least a fraction of a recycle stream, advantageously obtained from step d) or from optional step e) of the process, as a mixture with or separately from the feedstock comprising a plastics pyrolysis oil and/or a feedstock derived from renewable resources.

Said optional pretreatment step a0) thus makes it possible to obtain a pretreated feedstock which then feeds the selective hydrogenation step a or the hydrodemetallization step b).

Selective Hydrogenation Step a) (Optional)

According to the invention, the process may comprise a step a) of selective hydrogenation of the feedstock comprising a plastics pyrolysis oil, and optionally of the feedstock derived from renewable resources when the latter is injected in step a), performed in the presence of hydrogen, under hydrogen pressure and temperature conditions making it possible to maintain said feedstock in the liquid phase and with an amount of soluble hydrogen that is just necessary for selective hydrogenation of the diolefins present in said feedstock. Selective hydrogenation of at least a part of the diolefins in liquid phase thus makes it possible to avoid or at least to limit the formation of "gums", i.e. polymerization of the diolefins and thus the formation of oligomers and polymers, which can clog the reaction section of the hydrodemetallization step b) and/or the hydrotreatment step c). The styrene compounds, notably styrene, optionally present in the feedstock may also behave like the diolefins in terms of gum formation because the double bond of the vinyl group is conjugated with the aromatic nucleus. Said selective hydrogenation step a) makes it possible to obtain a selectively hydrogenated effluent, i.e. an effluent with a reduced content of olefins, in particular of diolefins, and optionally of styrene.

According to the invention, said selective hydrogenation step a) is performed in a reaction section fed at least with said feedstock comprising a plastics pyrolysis oil, which has optionally been pretreated, and a gas stream comprising hydrogen ($H_2$).

Optionally, the reaction section of said step a) may likewise also be fed with at least a part of the feedstock derived from renewable resources, which has optionally been pretreated.

Optionally, the reaction section of said step a) may likewise also be fed with at least a fraction of a recycle stream advantageously obtained from step d) or from the optional step e) of the process.

The feeding of the feedstock derived from renewable resources and/or the recycle stream can be carried out either as a mixture with said feedstock comprising a plastics pyrolysis oil, or separately from said feedstock, advantageously directly at the entry of the reaction section of step a).

Said reaction section involves selective hydrogenation, preferably in a fixed bed, in the presence of at least one selective hydrogenation catalyst, advantageously at an average temperature (or WABT as defined below) of between 80 and 280° C., preferably between 120 and 260° C., preferably between 130 and 250° C., a partial pressure of hydrogen of between 1.0 and 20.0 MPa abs., preferably between 5.0 and 15.0 MPa abs., and at an hourly space velocity (HSV) of between 0.3 and 10.0 $h^{-1}$, preferably between 0.5 and 5.0 $h^{-1}$.

According to the invention, the "temperature" of a reaction section comprising at least one fixed bed reactor is the average temperature of a reaction section comprising at least one fixed bed reactor and corresponds to the Weight Average Bed Temperature (WABT) according to the dedicated term, well known to those skilled in the art. The average temperature is advantageously determined as a function of the catalytic systems, of the devices and of the configuration thereof that are used. The average temperature (or WABT) is calculated in the following manner:

$$WABT = (T_{inlet} + T_{outlet})/2$$

with $T_{inlet}$: the temperature of the effluent at the inlet of the reaction section, $T_{outlet}$: the temperature of the effluent at the outlet of the reaction section.

The hourly space velocity (HSV) is defined here as the ratio of the hourly flow rate by volume of the feedstock entering the reaction section to the volume of catalyst(s). The expression "feedstock entering the reaction section of step a)" is intended to mean all of the "fresh" feedstock optionally pretreated, that is to say comprising at least the pyrolysis oil and optionally a part or all of the feedstock derived from renewable resources, optionally supplemented with a recycle stream obtained from steps d) and/or e).

The amount of the gas stream comprising hydrogen ($H_2$) feeding said reaction section of step a) is advantageously such that the hydrogen coverage is between 1 and 200 $Nm^3$ of hydrogen per $m^3$ of feedstock entering the reaction section ($Nm^3/m^3$), preferably between 1 and 50 $Nm^3$ of hydrogen per $m^3$ of feedstock ($Nm^3/m^3$), preferably between 5 and 20 $Nm^3$ of hydrogen per $m^3$ of feedstock ($Nm^3/m^3$).

The hydrogen coverage is defined as the ratio of the volume flow rate of hydrogen taken under standard temperature and pressure conditions relative to the volume flow rate of optionally pretreated feedstock entering the reaction section, without taking into account any recycled fraction, at 15° C. (in normal $m^3$, written as $Nm^3$, of $H_2$ per $m^3$ of feedstock).

The gas stream comprising hydrogen, which feeds the reaction section of step a), may consist of a supply of hydrogen and/or of recycled hydrogen advantageously obtained from step d) or from the optional step e).

The selective hydrogenation step a) is preferably carried out in a fixed bed. It may also be carried out in an ebullated bed or in a moving bed.

Advantageously, the reaction section of said step a) comprises between 1 and 5 reactors. According to a particular embodiment of the invention, the reaction section comprises between 2 and 5 reactors, which operate in permutable mode, referred to by the term PRS for permutable reactor system or by the term "lead and lag". Combination of at least two reactors in PRS mode makes it possible to isolate one reactor, to discharge the spent catalyst, to recharge the reactor with fresh catalyst and to return said reactor into service without stopping the process. The PRS technology is described in particular in patent FR2681871.

According to one particularly preferred variant, the selective hydrogenation reaction section of step a) comprises two fixed bed reactors operating in permutable mode.

Advantageously, reactor inserts, for example of filter plate type, may be used to prevent the clogging of the reactor(s). An example of a filter plate is described in patent FR3051375.

Advantageously, said selective hydrogenation catalyst comprises a support, preferably a mineral support, and a hydrodehydrogenating function.

According to one variant, the hydrodehydrogenating function in particular comprises at least one group VIII element, preferably chosen from nickel and cobalt, and at least one group VIB element, preferably chosen from molybdenum and tungsten. According to this variant, the total content expressed as oxides of metallic elements from groups VIB and VIII is preferably between 1% and 40% by weight and preferentially between 5% and 30% by weight relative to the total weight of the catalyst. When the metal is cobalt or nickel, the metal content is expressed as CoO and NiO, respectively. When the metal is molybdenum or tungsten, the metal content is expressed as $MoO_3$ and $WO_3$ respectively.

The weight ratio expressed as metal oxide between the group VIB metal(s) relative to the group VIII metal(s) is preferably between 1 and 20 and preferably between 2 and 10.

According to this variant, the reaction section of said step a) comprises, for example, a hydrogenation catalyst comprising between 0.5% and 12% by weight of nickel, preferably between 1% and 10% by weight of nickel (expressed as nickel oxide NiO relative to the weight of said catalyst), and between 1% and 30% by weight of molybdenum, preferably between 3% and 20% by weight of molybdenum (expressed as molybdenum oxide $MoO_3$ relative to the weight of said catalyst) on a support, preferably a mineral support, preferably on an alumina support.

According to another variant, the hydrodehydrogenating function comprises, and preferably consists of, at least one group VIII element, preferably nickel. According to this variant, the nickel content, expressed as NiO, is preferably between 1% and 50% by weight and preferably between 10% and 30% by weight relative to the weight of said catalyst. This type of catalyst is preferably used in its reduced form, on a support which is preferably mineral, preferably on an alumina support.

The support for said at least one selective hydrogenation catalyst is preferably chosen from alumina, silica, silica-aluminas, magnesia, clays and mixtures thereof. Said support may contain dopant compounds, notably oxides chosen from boron oxide, in particular boron trioxide, zirconia, ceria, titanium oxide, phosphorus pentoxide and a mixture of these oxides. Preferably, said at least one selective hydrogenation catalyst comprises an alumina support, optionally doped with phosphorus and optionally boron. When phosphorus pentoxide $P_2O_5$ is present, its concentration is less than 10% by weight relative to the weight of the alumina and advantageously at least 0.001% by weight relative to the total weight of the alumina. When boron trioxide $B_2O_3$ is present, its concentration is less than 10% by weight relative to the weight of the alumina and advantageously at least 0.001% relative to the total weight of the alumina. The alumina used may be, for example, a γ (gamma) or η (eta) alumina.

Said selective hydrogenation catalyst is, for example, in the form of extrudates.

Very preferably, in order to hydrogenate the diolefins as selectively as possible, step a) may also use, in addition to the selective hydrogenation catalysts described above, at least one selective hydrogenation catalyst used in step a) comprising less than 1% by weight of nickel and at least 0.1% by weight of nickel, preferably 0.5% by weight of nickel, expressed as nickel oxide NiO relative to the weight of said catalyst, and less than 5% by weight of molybdenum and at least 0.1% by weight of molybdenum, preferably 0.5% by weight of molybdenum, expressed as molybdenum oxide $MoO_3$ relative to the weight of said catalyst, on an alumina support. This catalyst sparingly charged with metals is preferably placed upstream of the selective hydrogenation catalysts described above.

The content of impurities, in particular of diolefins, of the hydrogenated effluent obtained on conclusion of step a) is reduced relative to that of the same impurities, in particular of diolefins, included in the feedstock for the process. The selective hydrogenation step a) generally makes it possible to convert at least 30% and preferably at least 40% of the diolefins contained in the initial feedstock. The hydrogenated effluent, obtained on conclusion of the selective hydrogenation step a), is sent, preferably directly, to the hydrodemetallization step b).

Hydrodemetallization Step b)

According to the invention, the process comprises a hydrodemetallization step b) performed in a hydrodemetallization reaction section comprising at least one hydrodemetallization catalyst, said hydrodemetallization reaction section being fed at least with said feedstock comprising a plastics pyrolysis oil, which has optionally been pretreated, and/or the hydrogenated effluent obtained from a), and a gas stream comprising hydrogen, said hydrodemetallization reaction section being performed at an average temperature of between 140 and 400° C., a partial pressure of hydrogen of between 1.0 and 20.0 Mpa abs., and an hourly space velocity of between 0.1 and 10.0 $h^{-1}$, to obtain a demetallized effluent.

Optionally, the reaction section of said step b) may likewise also be fed with at least a part of the feedstock derived from renewable resources, which has optionally been pretreated.

Optionally, the reaction section of said step b) may likewise also be fed with at least a fraction of a recycle stream advantageously obtained from step d) or from the optional step e) of the process.

Depending on the composition of the feedstock, the conditions of the hydrodemetallization step make it possible to carry out hydrodemetallization reactions, notably retention of silicon, hydrogenation reactions, notably of the diolefins and of the olefins, hydrotreatment reactions, notably of conversion of chlorine, of nitrogen and of sulfur, ester function hydrogenolysis and/or decarboxylation reactions.

The hydrodemetallization step b) can be performed in a hydrodemetallization reaction section comprising at least one hydrodemetallization catalyst using at least one ebullated bed, entrained bed, moving bed and/or fixed bed reactor.

According to one preferred mode, step b) is carried out in a fixed bed. Step b) carried out in a fixed bed is notably carried out under hydrogen pressure and temperature conditions which make it possible to perform the hydrogenation at least partly of the diolefins and olefins, notably in the absence of the optional selective hydrogenation step a), at the beginning of the hydrodemetallization reaction section, while at the same time allowing an increasing temperature profile such that the outlet temperature of the reaction section of step b) is preferably at least 15° C. higher than the inlet temperature of the reaction section of b). Indeed, a required amount of hydrogen is injected so as to allow the hydrogenation of at least a part of the diolefins and olefins present in the feedstock, the hydrodemetallization of at least a part of the metals and/or metalloids, notably the retention of silicon, and also the conversion of at least a part of the chlorine (to HCl according to a hydrodechlorination mechanism). The hydrogenation of the diolefins and olefins thus makes it possible to avoid or at least to limit the formation of "gums", i.e. polymerization of the diolefins and olefins and thus the formation of oligomers and polymers, which can clog the reaction section of the hydrotreatment step c). In parallel to the hydrogenation, the hydrodemetallization, and notably the retention of silicon during step b), makes it possible to limit the catalytic deactivation of the reaction section of the hydrotreatment step c). Furthermore, the conditions of step b), notably the temperature and the increasing temperature profile, make it possible to convert at least a part of the chlorine, to carry out a part of the hydrotreatment and therefore the removal of a part of the nitrogen and sulfur, to carry out a part of the conversion of the triglycerides and/or free fatty acids into hydrocarbon-based molecules via ester function decarboxylation and/or hydrogenolysis mechanisms.

When step b) is carried out in a fixed bed, the control of the temperature is thus important in this step and must satisfy an antagonistic constraint. On the one hand, the temperature at the inlet and throughout the hydrodemetallization reaction section must be sufficiently low to allow the hydrogenation of the diolefins and olefins at the beginning of the hydrodemetallization reaction section, notably in the absence of the optional step a). On the other hand, the temperature at the inlet of the hydrodemetallization reaction section must be sufficiently high to avoid deactivation of the catalyst induced by deposits of impurities that are promoted at low temperature. Since hydrogenation reactions, notably for hydrogenation of a part of the olefins and diolefins, and also the ester function decarboxylation and/or hydrogenolysis reactions, are highly exothermic, an increasing temperature profile is therefore observed in the hydrodemetallization reaction section. This higher temperature at the end of said section makes it possible to perform the hydrodemetallization and hydrodechlorination reactions. Thus, the temperature at the outlet of the reaction section of step b) is preferably at least 15° C. higher, preferably at least 25° C. higher and particularly preferably at least 30° C. higher than the temperature at the inlet of the reaction section of step b).

The difference in temperature between the inlet and the outlet of the reaction section of step b) is compatible with optional injection of any gas (hydrogen) cooling stream or liquid cooling stream (for example the recycling of a stream originating from steps d) and/or e)).

The difference in temperature between the inlet and the outlet of the reaction section of step b) is exclusively due to the exothermicity of the chemical reactions performed in the reaction section and is therefore compatible without the use of a heating means (oven, heat exchanger, etc.).

The inlet temperature of the reaction section of step b) is between 135 and 385° C., preferably between 210 and 335° C.

The outlet temperature of the reaction section of step b) is between 150 and 400° C., preferably between 225 and 350° C.

According to the invention, it is advantageous to at least partly carry out the hydrogenation of the diolefins and olefins, the hydrodemetallization reactions, in particular the retention of silicon, and a part of the hydrotreatment reactions in one and the same step and at a temperature sufficient to limit deactivation of the catalyst of step c). This same step also makes it possible to benefit from the heat from reactions so as to have an increasing temperature profile in this step and to thus be able to eliminate the need for a device for heating between the catalytic section for hydrodemetallization and the catalytic section for hydrotreatment.

Said reaction section performs a hydrodemetallization in the presence of at least one hydrodemetallization catalyst, advantageously at an (average) temperature (or WABT as defined above in step a)) of between 140 and 400° C., preferably between 220 and 350° C., particularly preferably between 260 and 330° C., a partial pressure of hydrogen of between 1.0 and 20.0 MPa abs., preferably between 1.5 and 15.0 MPa abs., and at an hourly space velocity (HSV) of between 0.1 and 10.0 $h^{-1}$, preferably between 0.2 and 5.0 $h^{-1}$, and very preferably between 0.3 and 3.0 $h^{-1}$.

The amount of the gas stream comprising hydrogen ($H_2$) feeding said reaction section of step b) is advantageously such that the hydrogen coverage is between 50 and 1000 $Nm^3$ of hydrogen per $m^3$ of feedstock ($Nm^3/m^3$), preferably between 50 and 500 $Nm^3$ of hydrogen per $m^3$ of feedstock ($Nm^3/m^3$), preferably between 200 and 300 $Nm^3$ of hydrogen per $m^3$ of feedstock ($Nm^3/m^3$). Indeed, the amount of hydrogen required to allow the hydrogenation of at least a part of the diolefins and olefins and the hydrodemetallization of at least a part of the metals, notably the retention of silicon, and also the conversion of at least a part of the chlorine (to HCl) and optionally the conversion of at least a part of the esters of renewable origin, is greater than the amount of hydrogen required to make it possible to perform only the hydrogenation of the diolefins as described in FR20/01.758.

The hourly space velocity (HSV) and the hydrogen coverage are defined as described in step a) with, as "feedstock entering the reaction section" all of the "fresh" feedstock which has been optionally pretreated (step a0)) and optionally selectively hydrogenated (step a)), that is to say comprising at least the pyrolysis oil and optionally a part or all of the feedstock derived from renewable resources, optionally supplemented with a recycle stream obtained from steps d) and/or e).

Advantageously, the reaction section of said step b) comprises between 1 and 5 reactors, preferably between 2 and 5 reactors, and particularly preferably it comprises two reactors.

The reactor(s) of the reaction section of step b) can be of fixed bed, ebullated bed, entrained bed and/or moving bed reactor type.

According to one variant, the reaction section comprises an ebullated bed reactor or a moving bed reactor allowing catalyst introduction and drawing off operations in order to compensate for the deactivation.

According to another variant, which is preferred, the reaction section comprises a fixed bed reactor and preferably two fixed bed reactors, having n catalytic beds, n being an integer greater than or equal to 1, each comprising at least one hydrodemetallization catalyst.

According to one particular embodiment, all or part of the feedstock can be injected in stages at the inlet of each catalytic bed so as to manage the exotherms, as described in FR2969642. In this case, the stream of the total feedstock is divided into a certain number of different partial streams equal to the number of catalytic beds in the reactor, and the different partial streams are injected at the inlet of the successive catalytic beds in increasing proportions.

According to one variant, the catalytic bed reactors operate in a fixed bed permutable mode, also known as "PRS" for Permutable Reactor System or else "lead and lag". Combination of at least two reactors in PRS mode makes it possible to isolate one reactor, to discharge the spent catalyst, to recharge the reactor with fresh catalyst and to return said reactor into service without stopping the process. The PRS technology is described in particular in patent FR2681871. The advantage of a hydrodemetallization reaction section comprising several reactors in permutable mode lies in optimized treatment of the feedstock, while at the same time making it possible to reduce the risks of clogging and/or deactivation of the catalytic bed(s) and thus to avoid stoppage of the unit due to clogging and/or to deactivation.

According to one particularly preferred variant, the hydrodemetallization reaction section of step b) comprises two reactors operating in permutable mode.

Advantageously, reactor inserts, for example of filter plate type, may be used to prevent the clogging of the reactor(s). An example of a filter plate is described in patent FR3051375.

Advantageously, said hydrodemetallization catalyst comprises a support, preferably a mineral support, and a hydrodehydrogenating function.

According to one variant, the hydrodehydrogenating function in particular comprises at least one group VIII element, preferably chosen from nickel and cobalt, and at least one group VIB element, preferably chosen from molybdenum and tungsten. According to this variant, the total content expressed as oxides of metallic elements from groups VIB and VIII is preferably between 1% and 40% by weight and preferentially between 5% and 30% by weight relative to the total weight of the catalyst. When the metal is cobalt or nickel, the metal content is expressed as CoO and NiO, respectively. When the metal is molybdenum or tungsten, the metal content is expressed as $MoO_3$ and $WO_3$ respectively.

The weight ratio expressed as metal oxide between the group VIB metal(s) relative to the group VIII metal(s) is preferably between 1 and 20 and preferably between 2 and 10.

According to this variant, the reaction section of said step b) comprises, for example, a hydrodemetallization catalyst comprising between 0.5% and 12% by weight of nickel, preferably between 1% and 10% by weight of nickel (expressed as nickel oxide NiO relative to the weight of said catalyst), and between 1% and 30% by weight of molybdenum, preferably between 3% and 20% by weight of molybdenum (expressed as molybdenum oxide $MoO_3$ relative to the weight of said catalyst) on a support, preferably a mineral support, preferably on an alumina support.

According to another variant, the hydrodehydrogenating function comprises, and preferably consists of, at least one group VIII element, preferably nickel. According to this variant, the content of nickel oxides is preferably between 1% and 50% by weight and preferably between 10% and 30% by weight relative to the weight of said catalyst. This type of catalyst is preferably used in its reduced form, on a support which is preferably mineral, preferably on an alumina support.

The support for said hydrodemetallization catalyst is preferably chosen from alumina, silica, silica-aluminas, magnesia, clays and mixtures thereof. Said support may contain dopant compounds, notably oxides chosen from boron oxide, in particular boron trioxide, zirconia, ceria, titanium oxide, phosphorus pentoxide and a mixture of these oxides. Preferably, said hydrodemetallization catalyst comprises an alumina support, optionally doped with phosphorus and optionally boron. When phosphorus pentoxide $P_2O_5$ is present, its concentration is less than 10% by weight relative to the weight of the alumina and advantageously at least 0.001% by weight relative to the total weight of the alumina. When boron trioxide $B_2O_3$ is present, its concentration is less than 10% by weight relative to the weight of the alumina and advantageously at least 0.001% relative to the total weight of the alumina. The alumina used may be, for example, a γ (gamma) or η (eta) alumina.

Said hydrodemetallization catalyst is, for example, in the form of extrudates.

Very preferably, step b) may also use, in addition to the hydrodemetallization catalyst(s) described above, at least one hydrodemetallization catalyst used in step b) comprising less than 1% by weight of nickel and at least 0.1% by weight of nickel, preferably 0.5% by weight of nickel, expressed as nickel oxide NiO relative to the weight of said catalyst, and less than 5% by weight of molybdenum and at least 0.1% by weight of molybdenum, preferably 0.5% by weight of molybdenum, expressed as molybdenum oxide $MoO_3$ relative to the weight of said catalyst, on an alumina support. This catalyst, not highly loaded with metals, can be preferably placed upstream or downstream, preferably downstream, of the hydrodemetallization catalyst(s) described above.

Advantageously, said catalyst used in said step b) may be chosen from known hydrodemetallization, hydrotreatment or silicon scavenging catalysts notably used for the treatment of petroleum cuts, and combinations thereof. Known hydrodemetallization catalysts are, for example, those described in the patents EP 0113297, EP 0113284, U.S. Pat. Nos. 5,221,656, 5,827,421, 7,119,045, 5,622,616 and 5,089, 463. Known silicon scavenging catalysts are, for example, those described in the patent applications CN 102051202 and US 2007/080099.

Said hydrodemetallization step b) makes it possible to obtain a demetallized effluent, i.e. with a reduced content of silicon and optionally with a reduced content of olefins, in particular of diolefins, of metals and of chlorine. Preferably, at least 50%, and more preferentially at least 75%, of the chlorine and of the silicon of the initial feedstock are removed during step b). The demetallized effluent obtained on conclusion of the hydrodemetallization step b) is sent, preferably directly, to the hydrotreatment step c).

Hydrotreatment Step c)

According to the invention, the treatment process comprises a hydrotreatment step c) performed in a hydrotreatment reaction section comprising at least one hydrotreatment catalyst, said hydrotreatment reaction section being fed at least with said demetallized effluent obtained from step b) and a gas stream comprising hydrogen, said hydrotreatment reaction section being used at a temperature of between 250 and 450° C., a partial pressure of hydrogen of between 1.0 and 20.0 MPa abs., and an hourly space velocity of between 0.1 and 10.0 $h^{-1}$, to obtain a hydrotreated effluent.

Optionally, the reaction section of said step c) may likewise also be fed with at least a part of the feedstock derived from renewable resources, which has optionally been pretreated.

According to one variant, at least a part and preferably all of the feedstock derived from renewable resources is introduced in step c).

Optionally, the reaction section of said step c) may likewise also be fed with at least a fraction of a recycle stream advantageously obtained from step d) or from the optional step e) of the process.

Advantageously, step c) implements hydrotreatment reactions that are well known to those skilled in the art, and more particularly hydrotreatment reactions, such as the hydrogenation of aromatics, hydrodesulfurization and hydrodeazotization. Furthermore, the hydrogenation of the olefins and of the remaining halogenated compounds and also the hydrodemetallization are continued. Step c) also performs reactions for hydrogenolysis and/or decarboxylation of the ester functions derived from the triglycerides and/or free fatty acids from renewable sources.

Said hydrotreatment reaction section is advantageously implemented at a pressure equivalent to that used in the reaction section of the hydrodemetallization step b), but at a higher temperature than that of the reaction section of the hydrodemetallization step b). Thus, said hydrotreatment reaction section is advantageously implemented at an (average) hydrotreatment temperature of between 250 and 450° C., preferably between 280 and 380° C., at a partial pressure of hydrogen of between 1.0 and 20.0 MPa abs., and at an hourly space velocity (HSV) of between 0.1 and 10.0 $h^{-1}$, preferably between 0.1 and 5.0 $h^{-1}$, preferentially between 0.2 and 2.0 $h^{-1}$, preferably between 0.2 and 1 $h^{-1}$. The hydrogen coverage in step c) is advantageously between 50 and 1000 $Nm^3$ of hydrogen per $m^3$ of feedstock which feeds step c), preferably between 50 and 500 $Nm^3$ of hydrogen per $m^3$ of feedstock which feeds step c), preferably between 100 and 300 $Nm^3$ of hydrogen per $m^3$ of feedstock which feeds step c). The definitions of temperature (WABT), of HSV and of hydrogen coverage correspond to those described above with, as "feedstock entering the reaction section of step c)", the demetallized effluent obtained from step b) and optionally a part or all of the feedstock derived from renewable resources, optionally supplemented with a recycle stream obtained from steps d) and/or e).

The (average) temperature of the reaction section of step c) is preferably higher than the (average) temperature of the hydrodemetallization reaction section of step b), preferably at least 10° C. higher, preferably at least 15° C. higher.

The gas stream comprising hydrogen, which feeds the reaction section of step c), may consist of a supply of hydrogen and/or of recycled hydrogen advantageously obtained from step d) or from the optional step e).

Advantageously, the reaction section of said step c) comprises between 1 and 5 reactors, preferably between 2 and 5 reactors, and particularly preferably it comprises two reactors.

The reactor(s) of the reaction section of step c) can be of fixed bed, ebullated bed, entrained bed and/or moving bed reactor type.

According to one variant, the reaction section comprises an ebullated bed reactor or a moving bed reactor allowing catalyst introduction and drawing off operations in order to compensate for the deactivation.

Advantageously, said step c) is performed in a hydrotreatment reaction section comprising at least one, preferably between 1 and 5, fixed bed reactors containing n catalytic beds, n being an integer greater than or equal to one, preferably between 1 and 10, preferably between 2 and 5, said bed(s) each comprising at least one and preferably not more than 10 hydrotreatment catalyst(s). When a reactor comprises several catalytic beds, i.e. at least two, preferably between two and ten, preferably between two and five, catalytic beds, said catalytic beds are preferably arranged in series in said reactor.

In one preferred embodiment of the invention, said hydrotreatment reaction section comprises a single fixed bed reactor containing n catalytic beds, n being an integer greater than or equal to one, preferably between one and ten, preferably between two and five.

According to one embodiment, all or part of the feedstock can be injected in stages at the inlet of each catalytic bed so as to manage the exotherms, as described hereinabove. According to one variant, notably when the feedstock derived from renewable resources is injected in step c), the feedstock obtained from step b) (pyrolysis oil) is introduced at the top of said hydrotreatment reaction section c), whereas the feedstock derived from renewable resources is injected in stages at the inlet of each catalytic bed in increasing proportions. This makes it possible to manage the exotherms more successfully.

When step c) is performed in a hydrotreatment reaction section comprising several reactors, preferably two reactors, these reactors can operate in series and/or in parallel and/or in permutable (or PRS) mode and/or in swing mode. The various optional operating modes, PRS (or lead and lag) mode and swing mode, are well known to those skilled in the art and are advantageously defined hereinabove.

Said hydrotreatment catalyst comprises a support, preferably a mineral support, and at least one metallic element having a hydrodehydrogenating function. Said metallic element having a hydrodehydrogenating function advantageously comprises at least one group VIII element, preferably chosen from the group consisting of nickel and cobalt, and/or at least one group VIB element, preferably chosen from the group consisting of molybdenum and tungsten. The total content of oxides of metallic elements from groups VIB and VIII is preferably between 0.1% and 40% by weight and preferentially from 5% to 35% by weight relative to the total weight of the catalyst. When the metal is cobalt or nickel, the metal content is expressed as CoO and NiO, respectively. When the metal is molybdenum or tungsten, the metal content is expressed as $MoO_3$ and $WO_3$ respectively. The weight ratio expressed as metal oxide between the group VIB metal(s) relative to the group VIII metal(s) is preferably between 1.0 and 20 and preferably between 2.0 and 10. For example, the hydrotreatment reaction section of step b) of the process comprises a hydrotreatment catalyst comprising between 0.5% and 10% by weight of nickel, preferably between 1% and 8% by weight of nickel, expressed as nickel oxide NiO relative to the total weight of the hydrotreatment catalyst, and between 1.0% and 30% by weight of molybdenum, preferably between 3.0% and 29% by weight of molybdenum, expressed as molybdenum oxide $MoO_3$ relative to the total weight of the hydrotreatment catalyst, on a mineral support, preferably on an alumina support.

The support for said hydrotreatment catalyst is advantageously chosen from alumina, silica, silica-aluminas, magnesia, clays and mixtures thereof. Said support may also contain dopant compounds, notably oxides chosen from boron oxide, in particular boron trioxide, zirconia, ceria, titanium oxide, phosphorus pentoxide and a mixture of these oxides. Preferably, said hydrotreatment catalyst comprises an alumina support, preferably an alumina support doped with phosphorus and optionally boron. When phosphorus pentoxide $P_2O_5$ is present, its concentration is less than 10% by weight relative to the weight of the alumina and advantageously at least 0.001% by weight relative to the total weight of the alumina. When boron trioxide $B_2O_5$ is present, its concentration is less than 10% by weight relative to the weight of the alumina and advantageously at least 0.001% relative to the total weight of the alumina. The alumina used may be, for example, a γ (gamma) or η (eta) alumina.

Said hydrotreatment catalyst is, for example, in the form of extrudates.

Known hydrotreatment catalysts are, for example, those described in the patents EP0113297, EP0113284, U.S. Pat. Nos. 6,589,908, 4,818,743 or 6,332,976.

Advantageously, said hydrotreatment catalyst used in step c) of the process has a specific surface area of greater than or equal to 250 m²/g, preferably greater than or equal to 300 m²/g. The specific surface area of said hydrotreatment catalyst is advantageously less than or equal to 800 m²/g, preferably less than or equal to 600 m²/g, in particular less than or equal to 400 m²/g. The specific surface area of the hydrotreatment catalyst is measured by the BET method, i.e. the specific surface area determined by nitrogen adsorption in accordance with the standard ASTM D 3663-78 established from the Brunauer-Emmett-Teller method described in the periodical *The Journal of the American Chemical Society*, 60, 309 (1938). Such a specific surface area makes it possible to further improve the removal of the contaminants, in particular of the metals such as silicon.

According to another aspect of the invention, the hydrotreatment catalyst as described above also comprises one or more organic compounds containing oxygen and/or nitrogen and/or sulfur. Such a catalyst is often denoted by the term "additivated catalyst". Generally, the organic compound is chosen from a compound including one or more chemical functions chosen from carboxylic, alcohol, thiol, thioether, sulfone, sulfoxide, ether, aldehyde, ketone, ester, carbonate, amine, nitrile, imide, oxime, urea and amide functions or else compounds including a furan ring or else sugars.

Since the feedstock of renewable origin contains little or no sulfur, then depending on the sulfur content of the feedstock derived from plastics pyrolysis, it may be advantageous to inject a sulfur-bearing compound, for example DMDS, in order to maintain the active phase of the catalysts in sulfide form. The addition of a sulfur-containing compound may also be carried out for the catalysts of the other steps (steps a), b) and/or c')).

Advantageously, the hydrotreatment step c) allows the hydrotreatment of at least 80% of the nitrogen remaining after the hydrodemetallization step b), but also the conversion of at least 80% of the triglycerides. Step c) also allows the partial removal of other impurities present in the feedstock, such as the aromatic compounds, the metallic compounds, the sulfur-bearing compounds, the nitrogen-bearing compounds, the halogenated compounds (notably the chlorinated compounds) or the oxygen-bearing compounds. Preferably, the nitrogen content at the output of step c) is less than 10 ppm by weight. Step c) may also make it possible to even further reduce the content of contaminants, such as that of the metals, in particular the silicon content. Preferably, the metal content at the output of step c) is less than 10 ppm by weight and the silicon content is less than 5 ppm by weight.

Hydrocracking Step c') (Optional)

According to one variant, the process of the invention may comprise a hydrocracking step c') performed either directly after the hydrotreatment step c), or after the fractionation step e) on a hydrocarbon cut comprising compounds with a boiling point greater than 175° C.

Advantageously, step c') implements hydrocracking reactions that are well known to those skilled in the art, and more particularly makes it possible to convert the heavy compounds, for example compounds with a boiling point of greater than 175° C., into compounds with a boiling point of less than or equal to 175° C. contained in the hydrotreated effluent obtained from step c) or separated during the optional fractionation step e). Other reactions, such as the hydrogenation of olefins or of aromatics, hydrodemetallization, hydrodesulfurization, hydrodeazotization, etc. may follow.

The compounds with a boiling point greater than 175° C. have a high BMCI and contain, relative to lighter compounds, more naphthenic, naphtheno-aromatic and aromatic compounds, thus leading to a higher C/H ratio. This high ratio is a cause of coking in the steam cracker, thus requiring steam cracking furnaces dedicated to this cut. When it is desired to minimize the yield of these heavy compounds (diesel cut) and to maximize the yield of light compounds (naphtha cut), these compounds can be at least partly converted into light compounds by hydrocracking, a cut generally favoured for a steam cracking unit.

Thus, the process of the invention may comprise a hydrocracking step c') performed in a hydrocracking reaction section comprising at least one hydrocracking catalyst, said hydrocracking reaction section being fed with said hydrotreated effluent obtained from step c) and/or with the cut comprising compounds having a boiling point greater than 175° C. obtained from step e) and a gas stream comprising hydrogen, said hydrocracking reaction section being used at an (average) temperature of between 250 and 450° C., a partial pressure of hydrogen of between 1.5 and 20.0 MPa abs., and an hourly space velocity of between 0.1 and 10.0 h⁻¹, to obtain a hydrocracked effluent which is sent into the separation step d).

Thus, said hydrocracking reaction section is advantageously implemented at a hydrocracking temperature of between 250 and 450° C., preferably between 320 and 440° C., at a partial pressure of hydrogen of between 1.5 and 20.0 MPa abs., preferably between 2 and 18.0 MPa abs., and at an hourly space velocity (HSV) of between 0.1 and 10.0 h⁻¹, preferably between 0.1 and 5.0 h⁻¹, preferentially between 0.2 and 4 h⁻¹. The hydrogen coverage in step c') is advantageously between 80 and 2000 Nm³ of hydrogen per m³ of feedstock which feeds step c'), and preferably between 200 and 1800 Nm³ of hydrogen per m³ of feedstock which feeds step c'). The definitions of temperature (WABT), of HSV and of hydrogen coverage correspond to those described above with, as "feedstock entering the reaction section of step c')", the hydrotreated effluent obtained from step c) and/or the hydrocarbon cut comprising compounds having a boiling point of greater than 175° C. obtained from step e).

Advantageously, said hydrocracking reaction section is implemented at a pressure equivalent to that used in the reaction section of the hydrodemetallization step b) or the hydrotreatment step c). According to another variant, said hydrocracking reaction section is implemented at a pressure greater than that used in the reaction section of the hydrodemetallization step b) or the hydrotreatment step c).

The reactor(s) of the reaction section of step c') can be of fixed bed, ebullated bed, entrained bed and/or moving bed reactor type, preferably of fixed bed type.

Advantageously, said step c') is performed in a hydrocracking reaction section comprising at least one, preferably between one and five, fixed bed reactors containing n catalytic beds, n being an integer greater than or equal to one, preferably between one and ten, preferably between two and five, said bed(s) each comprising at least one, and preferably not more than ten, hydrocracking catalysts. When a reactor comprises several catalytic beds, i.e. at least two, preferably between two and ten, preferably between two and five, catalytic beds, said catalytic beds are preferably arranged in series in said reactor.

The hydrotreatment step c) and the hydrocracking step c') may advantageously be performed in the same reactor or in different reactors. When they are performed in the same reactor, the reactor comprises several catalytic beds, the first catalytic beds comprising the hydrotreatment catalyst(s) and the following catalytic beds comprising the hydrocracking catalyst(s).

The hydrocracking step can be performed in one step (step c') or two steps (steps c') and c")). When it is performed in two steps, a fractionation of the effluent obtained from the first hydrocracking step c') is carried out, making it possible to obtain a cut comprising compounds with a boiling point greater than 175° C. (diesel cut) during steps d) and e), which cut is introduced into the second hydrocracking step c") comprising a dedicated second hydrocracking reaction section different from the first hydrocracking reaction section c'). This configuration is particularly suitable when it is desired to maximize the naphtha cut.

The second hydrocracking step c") performed in a hydrocracking reaction section, using at least one fixed bed containing n catalytic beds, n being an integer greater than or equal to 1, each comprising at least one hydrocracking catalyst, said hydrocracking reaction section being fed at least with the cut comprising compounds with a boiling point of greater than 175° C. obtained from the step e) and a gas stream comprising hydrogen, said hydrocracking reaction section being used at an average temperature of between 250 and 450° C., a partial pressure of hydrogen of between 1.5 and 20.0 MPa abs., and an hourly space velocity of between 0.1 and 10.0 $h^{-1}$, to obtain a hydrocracked effluent which is sent into the separation step d). The preferred operating conditions and the catalysts used in the second hydrocracking step are those described for the first hydrocracking step. The operating conditions and catalysts used in the two hydrocracking steps may be identical or different.

Said second hydrocracking step is preferably performed in a hydrocracking reaction section comprising at least one, preferably between one and five, fixed bed reactors containing n catalytic beds, n being an integer greater than or equal to one, preferably between one and ten, preferably between two and five, said bed(s) each comprising at least one and preferably not more than ten hydrocracking catalysts.

These operating conditions used in the hydrocracking step(s) generally make it possible to obtain conversions per pass, into products having at least 80% by volume of compounds with boiling points of less than or equal to 175° C., preferably less than 160° C. and preferably less than 150° C., and greater than 15% by weight and even more preferably of between 20 and 95% by weight. When the process is performed in two hydrocracking steps, the conversion per pass in the second step is kept moderate in order to maximize the selectivity for compounds of the naphtha cut (with a boiling point of less than or equal to 175° C., in particular between 80 and less than or equal to 175° C.). This recycle ratio is defined as the ratio between the flow rate of compounds with a boiling point greater than 175° C. obtained from step e) and the flow rate of the feedstock of step c); preferentially, this ratio is between 0.2 and 4, preferably between 0.5 and 2.5.

The hydrocracking step(s) thus does (do) not necessarily make it possible to convert all the compounds with a boiling point greater than 175° C. (diesel cut) into compounds with a boiling point of less than or equal to 175° C. (naphtha cut). After the fractionation step e), there may therefore remain a more or less significant proportion of compounds with a boiling point greater than 175° C. In order to increase the conversion, at least a part of this unconverted cut can be recycled as described below to step c') or else can be sent into a second hydrocracking step c"). Another part can be purged. Depending on the operating conditions of the process, said purge may be between 0 and 10% by weight of the cut comprising compounds with a boiling point greater than 175° C. relative to the ingoing feedstock, and preferably between 0.5% and 5% by weight.

In accordance with the invention, the hydrocracking step(s) operate(s) in the presence of at least one hydrocracking catalyst.

The hydrocracking catalyst(s) used in the hydrocracking step(s) are conventional hydrocracking catalysts known to those skilled in the art, of bifunctional type combining an acid function with a hydro-dehydrogenating function and optionally at least one binder matrix. The acid function is provided by supports having large surface areas (generally 150 to 800 $m^2/g$) having surface acidity, such as halogenated (notably chlorinated or fluorinated) aluminas, combinations of boron and aluminium oxides, amorphous silica-aluminas and zeolites. The hydro-dehydrogenating function is provided by at least one metal from group VIB of the Periodic Table and/or at least one metal from group VIII.

Preferably, the hydrocracking catalyst(s) comprise a hydro-dehydrogenating function comprising at least one metal from group VIII chosen from iron, cobalt, nickel, ruthenium, rhodium, palladium and platinum, and preferably from cobalt and nickel. Preferably, said catalyst(s) also comprise at least one metal from group VIB chosen from chromium, molybdenum and tungsten, alone or as a mixture, and preferably from molybdenum and tungsten. Hydro-dehydrogenating functions of NiMo, NiMoW or NiW type are preferred. Preferably, the content of metal from group VIII in the hydrocracking catalyst(s) is advantageously between 0.5% and 15% by weight and preferably between 1% and 10% by weight, the percentages being expressed as weight percentage of oxides relative to the total weight of the catalyst. When the metal is cobalt or nickel, the metal content is expressed as CoO and NiO, respectively.

Preferably, the content of metal from group VIB in the hydrocracking catalyst(s) is advantageously between 5% and 35% by weight and preferably between 10% and 30% by weight, the percentages being expressed as weight percentage of oxides relative to the total weight of the catalyst. When the metal is molybdenum or tungsten, the metal content is expressed as $MoO_3$ and $WO_3$ respectively.

The hydrocracking catalyst(s) may also optionally comprise at least one promoter element deposited on the catalyst and chosen from the group formed by phosphorus, boron and silicon, optionally at least one element from group VIIA (chlorine and fluorine preferred), optionally at least one element from group VIIB (manganese preferred), and optionally at least one element from group VB (niobium preferred).

Preferably, the hydrocracking catalyst(s) comprise at least one amorphous or poorly crystallized porous mineral matrix of oxide type chosen from aluminas, silicas, silica-aluminas, aluminates, alumina-boron oxide, magnesia, silica-magnesia, zirconia, titanium oxide or clay, alone or as a mixture, and preferably aluminas or silica-aluminas, alone or as a mixture. Preferably, the silica-alumina contains more than 50% by weight of alumina, preferably more than 60% by weight of alumina.

Preferably, the hydrocracking catalyst(s) also optionally comprise a zeolite chosen from Y zeolites, preferably from USY zeolites, alone or in combination with other zeolites from among beta, ZSM-12, IZM-2, ZSM-22, ZSM-23, SAPO-11, ZSM-48 or ZBM-30 zeolites, alone or as a mixture. Preferably, the zeolite is USY zeolite alone.

When said catalyst comprises a zeolite, the content of zeolite in the hydrocracking catalyst(s) is advantageously between 0.1% and 80% by weight, preferably between 3% and 70% by weight, the percentages being expressed as a percentage of zeolite relative to the total weight of the catalyst.

A preferred catalyst comprises, and preferably consists of, at least one metal from group VIB and optionally at least one non-noble metal from group VIII, at least one promoter element, and preferably phosphorus, at least one Y zeolite and at least one alumina binder.

An even more preferred catalyst comprises, and preferably consists of, nickel, molybdenum, phosphorus, a USY zeolite, and optionally also a beta zeolite, and alumina.

Another preferred catalyst comprises, and preferably consists of, nickel, tungsten, alumina and silica-alumina.

Another preferred catalyst comprises, and preferably consists of, nickel, tungsten, a USY zeolite, alumina and silica-alumina.

Said hydrocracking catalyst is, for example, in the form of extrudates.

In one variant, the hydrocracking catalyst used in step c") comprises a hydro-dehydrogenating function comprising at least one noble metal from group VIII chosen from palladium and platinum, alone or as a mixture. The content of noble metal from group VIII is advantageously between 0.01% and 5% by weight and preferably between 0.05% and 3% by weight, the percentages being expressed as weight percentage of oxides (PtO or PdO) relative to the total weight of catalyst.

According to another aspect of the invention, the hydrocracking catalyst as described above also comprises one or more organic compounds containing oxygen and/or nitrogen and/or sulfur. Such a catalyst is often denoted by the term "additivated catalyst". Generally, the organic compound is chosen from a compound including one or more chemical functions chosen from carboxylic, alcohol, thiol, thioether, sulfone, sulfoxide, ether, aldehyde, ketone, ester, carbonate, amine, nitrile, imide, oxime, urea and amide functions or else compounds including a furan ring or else sugars.

The preparation of the catalysts for steps a), b), c) c') or c") is known and generally comprises a step of impregnation of the group VIII metals and of the group VIB metals when present, and optionally of the phosphorus and/or boron on the support, followed by drying, and then optionally calcining. In the case of an additivated catalyst, the preparation generally takes place by simple drying without calcining after introducing the organic compound. The term "calcining" means herein a heat treatment under a gas containing air or oxygen at a temperature of greater than or equal to 200° C. Before their use in a process step, the catalysts are generally subjected to sulfurization so as to form the active species. The catalyst of step a) may also be a catalyst used in its reduced form, thus involving a reduction step in its preparation.

The gas stream comprising hydrogen, which feeds the reaction section of a), b), c), c') or c") may consist of a supply of hydrogen and/or of recycled hydrogen advantageously obtained from step d) or from the optional step e). Preferably, an additional gas stream comprising hydrogen is advantageously introduced into the inlet of each reactor, in particular operating in series, and/or into the inlet of each catalytic bed from the second catalytic bed of the reaction section. These additional gas streams are also referred to as cooling streams. They make it possible to control the temperature in the reactor in which the reactions involved are generally highly exothermic.

Optionally, each of steps a), b), c), c') or c") can use a heating section located upstream of the reaction section and in which the ingoing effluent is heated so as to reach a suitable temperature. Said optional heating section can thus comprise one or more exchangers, preferably allowing heat exchange between the hydrotreated and/or hydrocracked effluents and the feedstock which feeds steps b), c) and c'), and/or a preheating oven.

However, the performing of step b) at a relatively high temperature with an increasing profile optionally makes it possible to eliminate the need for a heating device or at least to reduce the heat requirement between the hydrodemetallization catalytic section of step b) and the hydrotreatment catalytic section of step c).

Separation Step d)

According to the invention, the treatment process comprises a separation step d), advantageously performed in at least one washing/separation section, fed at least with the hydrotreated effluent obtained from step c), or the hydrocracked effluent obtained from optional steps c') and c"), and an aqueous solution, to obtain at least one gaseous effluent, an aqueous effluent and a hydrocarbon-based effluent.

The gaseous effluent obtained on conclusion of step d) advantageously comprises hydrogen, preferably comprises at least 80% by volume, preferably at least 85% by volume, of hydrogen. Advantageously, said gaseous effluent may be at least partly recycled into the selective hydrogenation step a) and/or the hydrodemetallization step b) and/or the hydrotreatment step c) and/or the hydrocracking step c') and/or the hydrocracking step c").

The aqueous effluent obtained on conclusion of step d) advantageously comprises ammonium salts and/or hydrochloric acid.

This separation step d) in particular makes it possible to remove the ammonium chloride salts which form by reaction between the chloride ions, released by hydrogenation of the chlorinated compounds notably in HCl form during step c) followed by dissolution in the water, and the ammonium ions, generated by hydrogenation of the nitrogenous compounds in the form of $NH_3$ notably during step c) and/or provided by injection of an amine followed by dissolution in the water, and thus to limit the risks of clogging, in particular in the transfer lines and/or in the sections of the process of the invention and/or the transfer lines to the steam cracker, due to the precipitation of the ammonium chloride salts. It also makes it possible to remove the hydrochloric acid formed by the reaction of the hydrogen ions and the chloride ions.

As a function of the content of chlorinated compounds in the initial feedstock to be treated, a stream containing an amine, for instance monoethanolamine, diethanolamine and/or monodiethanolamine, may be injected upstream of or in the middle of the selective hydrogenation step a) and/or the hydrodemetallization step b) and/or the hydrotreatment step c) and/or the hydrocracking step c') and/or the separation step d), preferably upstream of the hydrotreatment step c), so as to ensure a sufficient amount of ammonium ions to combine with the chloride ions formed during the hydrotreatment step c), thus making it possible to limit the formation of hydrochloric acid and thus to limit corrosion downstream of the separation section.

Advantageously, the separation step d) comprises injection of an aqueous solution, preferably injection of water, into the hydrotreated effluent obtained from step c), or the hydrocracked effluent obtained from the optional steps c') and c"), upstream of the washing/separation section, so as to at least partly dissolve the ammonium chloride salts and/or the hydrochloric acid and thus to improve the removal of the chlorinated impurities and to reduce the risks of clogging caused by accumulation of the ammonium chloride salts.

The separation step d) is advantageously carried out at a temperature of between 50 and 450° C., preferentially between 100 and 440° C., preferably between 200 and 420° C. It is important to carry out said step in this temperature range (and therefore not to cool the effluent of step c) too much) at the risk of blocking in the lines due to the precipitation of the ammonium chloride salts. Advantageously, the separation step d) is carried out at a pressure close to that used in steps a), b) and/or c), preferably between 1.0 and 20.0 MPa, so as to facilitate the recycling of hydrogen.

The washing/separation section of step d) may be at least partly performed in common or separate washing and separation equipment, this equipment being well known (separating vessels which may be operated at various pressures and temperatures, pumps, heat exchangers, washing columns, etc.).

In one optional embodiment of the invention, the separation step d) comprises the injection of an aqueous solution into the hydrotreated effluent obtained from step c), followed by the washing/separation section advantageously comprising a separation phase for obtaining at least one aqueous effluent charged with ammonium salts, a washed liquid hydrocarbon-based effluent and a partially washed gaseous effluent. The aqueous effluent charged with ammonium salts and the washed liquid hydrocarbon-based effluent may subsequently be separated in a decanting vessel so as to obtain said hydrocarbon-based effluent and said aqueous effluent. Said partially washed gaseous effluent may, in parallel, be introduced into a washing column where it circulates counter-currentwise relative to an aqueous stream, preferably of the same nature as the aqueous solution injected into the hydrotreated effluent, which makes it possible to at least partly, and preferably totally, remove the hydrochloric acid and the $CO_2$ contained in the partially washed gaseous effluent and thus to obtain said gaseous effluent, preferably essentially comprising hydrogen, and an acidic aqueous stream. Said aqueous effluent obtained from the decanting vessel may optionally be mixed with said acidic aqueous stream, and be used, optionally as a mixture with said acidic aqueous stream, in a water recycling circuit to feed step d) of separation into said aqueous solution upstream of the washing/separation section and/or into said aqueous stream in the washing column. Said water recycling circuit may include a supply of water and/or of a basic solution and/or a purge for removing the dissolved salts.

The purification of the gaseous effluent comprising hydrogen can be carried out by known techniques (purge, amine washing, pressure swing adsorption or PSA, etc.). Preferably, the purification of the gaseous effluent comprising hydrogen is carried out at least by means of an amine washing column making possible to at least partly remove the carbon dioxide formed during the decarboxylation of the ester functions of renewable origin. Monoethanolamine, diethanolamine and/or monodiethanolamine are examples of amines which may be used in the column for washing the gas.

In another optional embodiment of the invention, the separation step d) may advantageously comprise a "high-pressure" washing/separation section which operates at a pressure close to the pressure of the selective hydrogenation step a) and/or of the hydrodemetallization step b) and/or of the hydrotreatment step c) and/or of the optional hydrocracking step c'), preferably between 1.0 and 20.0 MPa, so as to facilitate the recycling of hydrogen. This optional "high-pressure" section of step d) may be completed with a "low-pressure" section, so as to obtain a hydrocarbon-based liquid fraction free of a portion of the gases dissolved at high pressure and intended to be treated directly in a steam cracking process or optionally to be sent into the fractionation step e).

The gas fraction(s) obtained from the separation step d) may undergo additional purification(s) and separation(s) for the purpose of recovering at least one hydrogen-rich gas which may be recycled upstream of steps a) and/or b) and/or c) and/or c') and/or c") and/or light hydrocarbons, notably ethane, propane and butane, which may advantageously be sent separately or as a mixture into one or more furnaces of the steam cracking step f) so as to increase the overall yield of olefins.

The hydrocarbon-based effluent obtained from the separation step d) is sent, partly or totally, either directly to the inlet of a steam cracking unit, or into an optional fractionation step e). Preferably, the hydrocarbon-based liquid effluent is sent, partly or totally, preferably totally, into a fractionation step e).

Fractionation Step e) (Optional)

The process according to the invention may comprise a step of fractionating all or a part, preferably all, of the hydrocarbon-based effluent obtained from step d), to obtain at least one gas stream and at least two liquid hydrocarbon-based streams, said two liquid hydrocarbon-based streams being at least one naphtha cut comprising compounds with a boiling point of less than or equal to 175° C., in particular between 80 and 175° C., and one hydrocarbon cut comprising compounds with a boiling point of greater than 175° C.

Step e) makes it possible in particular to remove the gases dissolved in the hydrocarbon-based liquid effluent, for instance ammonia, hydrogen sulfide and light hydrocarbons containing 1 to 4 carbon atoms.

The optional fractionation step e) is advantageously performed at a pressure of less than or equal to 1.0 MPa abs., preferably between 0.1 and 1.0 MPa abs.

According to one embodiment, step e) may be performed in a section advantageously comprising at least one stripping column equipped with a reflux circuit comprising a reflux vessel. Said stripping column is fed with the hydrocarbon-based liquid effluent obtained from step d) and with a steam stream. The hydrocarbon-based liquid effluent obtained from step d) may optionally be heated before entering the stripping column. Thus, the lightest compounds are entrained to the top of the column and into the reflux circuit comprising a reflux vessel in which a gas/liquid separation is performed. The gaseous phase which comprises the light hydrocarbons is withdrawn from the reflux vessel as a gas stream. The naphtha cut comprising compounds with a boiling point of less than or equal to 175° C. is advantageously withdrawn from the reflux vessel. The hydrocarbon cut comprising compounds with a boiling point of greater than 175° C. is advantageously withdrawn at the bottom of the stripping column.

According to other embodiments, the fractionation step e) may involve a stripping column followed by a distillation column or only a distillation column.

The naphtha cut comprising compounds with a boiling point of less than or equal to 175° C. and the cut comprising compounds with a boiling point of greater than 175° C., which are optionally mixed, may be sent, totally or partly, to a steam cracking unit, at the outlet of which olefins may be (re)formed to participate in the formation of polymers. Preferably, only a part of said cuts is sent to a steam cracking unit; at least a fraction of the remaining part is optionally recycled into at least one of the steps of the process and/or sent to a fuel storage unit, for example a naphtha storage unit, a diesel storage unit or a kerosene storage unit, obtained from conventional petroleum-based feedstocks.

According to a preferred embodiment, the naphtha cut comprising compounds with a boiling point of less than or equal to 175° C. is sent, totally or partly, to a steam cracking unit, whereas the cut comprising compounds with a boiling point of greater than 175° C. is recycled to step a) and/or b) and/or c) and/or c') and/or sent to a fuel storage unit.

In a particular embodiment, the optional fractionation step e) may make it possible to obtain, besides a gas stream, a naphtha cut comprising compounds with a boiling point of less than or equal to 175° C., preferably between 80 and 175° C., and a diesel cut comprising compounds with a boiling point of greater than 175° C. and less than 385° C., and a hydrocarbon cut comprising compounds with a boiling point of greater than or equal to 385° C., known as the heavy hydrocarbon cut. The naphtha cut may be sent, totally or partly, to a steam cracking unit and/or to the naphtha pool obtained from conventional petroleum-based feedstocks; it may also be recycled; the diesel cut may also be sent, totally or partly, either to a steam cracking unit, or to a diesel pool obtained from conventional petroleum-based feedstocks, or else may be recycled; the heavy cut may, for its part, be sent, at least partly, to a steam cracking unit, or may be recycled, in particular in step c') or in step c").

In another particular embodiment, the naphtha cut comprising compounds with a boiling point of less than or equal to 175° C. obtained from step e) is fractionated into a heavy naphtha cut comprising compounds with a boiling point of between 80 and 175° C. and a light naphtha cut comprising compounds with a boiling point of less than 80° C., at least a part of said heavy naphtha cut being sent to an aromatic complex including at least one naphtha reforming step for the purpose of producing aromatic compounds. According to this embodiment, at least a part of the light naphtha cut is sent into the steam cracking step f) described below.

The gas fraction(s) obtained from the fractionation step e) may undergo additional purification(s) and separation(s) for the purpose of recovering at least light hydrocarbons, notably ethane, propane and butane, which may advantageously be sent separately or as a mixture into one of or the furnaces of the steam cracking step f) so as to increase the overall yield of olefins.

Recycling of the Cut Comprising Compounds with a Boiling Point of Greater than 175° C.

At least one fraction of the cut comprising compounds with a boiling point of greater than 175° C. obtained from the fractionation step e) can be recovered to constitute a recycle stream which is sent upstream of or directly to at least one of the reaction steps of the process according to the invention, in particular to the selective hydrogenation step a) and/or the hydrodemetallization step b) and/or the hydrotreatment step c) and/or the hydrocracking step c') and/or the hydrocracking step c"). Optionally, a fraction of the recycle stream may be sent to the optional step a0).

The recycle stream may feed said reaction steps a) and/or b) and/or c) and/or c') and/or c") in a single injection or may be divided into several fractions to feed the reaction steps in several injections, i.e. into different catalytic beds.

Advantageously, the amount of the recycle stream of the cut comprising compounds with a boiling point of greater than 175° C. is adjusted so that the weight ratio between the recycle stream and the feedstock comprising a plastics pyrolysis oil and a feedstock from renewable sources, i.e. the feedstock to be treated feeding the overall process, is less than or equal to 10, preferably less than or equal to 5, and preferentially greater than or equal to 0.001, preferably greater than or equal to 0.01, and preferably greater than or equal to 0.1. Very preferably, the amount of the recycle stream is adjusted so that the weight ratio between the recycle stream and the feedstock comprising a plastics pyrolysis oil and a feedstock from renewable sources is between 0.2 and 5.

According to one preferred variant, at least a fraction of the cut comprising compounds with a boiling point of greater than 175° C. obtained from the fractionation step e) is sent into the hydrocracking step c') when it is present.

According to another preferred variant, at least a fraction of the cut comprising compounds with a boiling point of greater than 175° C. obtained from the fractionation step e) is sent into a second hydrocracking step c") when it is present.

The recycling of a part of the cut comprising compounds with a boiling point of greater than 175° C. into or upstream of at least one of the reaction steps of the process according to the invention, and notably into the hydrocracking steps c') and/or c"), advantageously makes it possible to increase the yield of naphtha cut with a boiling point of less than 175° C. The recycling also makes it possible to dilute the impurities and moreover to control the temperature in the reaction step(s) in which the reactions involved may be highly exothermic.

A purge may be installed on the recycling of the cut comprising compounds with a boiling point of greater than 175° C. Depending on the operating conditions of the process, said purge may be between 0 and 10% by weight of the cut comprising compounds with a boiling point of greater than 175° C. relative to the entering feedstock, and preferably between 0.5% and 5% by weight.

Recycling of the Hydrocarbon-Based Effluent Obtained from Step d) and/or of the Naphtha Cut with a Boiling Point of Less than or Equal to 175° C. Obtained from Step e)

A fraction of the hydrocarbon-based effluent obtained from the separation step d) or a fraction of the naphtha cut with a boiling point of less than or equal to 175° C. obtained from the optional fractionation step e) may be recovered to constitute a recycle stream which is sent upstream of or directly into at least one of the reaction steps of the process according to the invention, in particular into the selective hydrogenation step a) and/or the hydrodemetallization step b) and/or the hydrotreatment step c). Optionally, a fraction of the recycle stream may be sent to the optional pretreatment step a0).

Preferably, at least a fraction of the hydrocarbon-based effluent obtained from the separation step d) or of the naphtha cut with a boiling point of less than or equal to 175° C. obtained from the optional fractionation step e) feeds the hydrotreatment step c).

Advantageously, the amount of the recycle stream, i.e. the fraction of recycled product obtained, is adjusted so that the weight ratio between the recycle stream and the feedstock comprising a plastics pyrolysis oil and a feedstock from a renewable source, i.e. the feedstock to be treated feeding the overall process, is less than or equal to 10, preferably less than or equal to 5, and preferentially greater than or equal to 0.001, preferably greater than or equal to 0.01, and preferably greater than or equal to 0.1. Very preferably, the amount of the recycle stream is adjusted so that the weight ratio between the recycle stream and the feedstock comprising a plastics pyrolysis oil and a feedstock from a renewable source is between 0.2 and 5.

Advantageously, for the starting phases of the process, a hydrocarbon cut external to the process may be used as recycle stream. Those skilled in the art will then know how to choose said hydrocarbon cut.

The recycling of a part of the product obtained into or upstream of at least one of the reaction steps of the process according to the invention advantageously makes it possible, firstly, to dilute the impurities and, secondly, to control the temperature in the reaction step(s) in which the reactions involved may be highly exothermic.

Said hydrocarbon-based effluent or said hydrocarbon-based stream(s) thus obtained by treatment according to the process of the invention of a plastics pyrolysis oil and a feedstock from a renewable source has (have) a composition that is compatible with the specifications for a feedstock entering a steam cracking unit. In particular, the composition of the hydrocarbon-based effluent or of said hydrocarbon-based stream(s) is preferably such that:

the total content of metallic elements is less than or equal to 5.0 ppm by weight, preferably less than or equal to 2.0 ppm by weight, preferentially less than or equal to 1.0 ppm by weight and preferably less than or equal to 0.5 ppm by weight, with:
a content of silicon element (Si) of less than or equal to 1.0 ppm by weight, preferably less than or equal to 0.6 ppm by weight, and
a content of iron element (Fe) of less than or equal to 100 ppb by weight,
the sulfur content is less than or equal to 500 ppm by weight, preferably less than or equal to 200 ppm by weight,
the oxygen content is less than or equal to 0.5% by weight, preferably less than 0.1% by weight,
the nitrogen content is less than or equal to 100 ppm by weight, preferably less than or equal to 50 ppm by weight and preferably less than or equal to 5 ppm by weight,
the content of asphaltenes is less than or equal to 5.0 ppm by weight,
the total content of chlorine element is less than or equal to 10 ppm by weight, preferably less than 1.0 ppm by weight,
the content of olefinic compounds (monoolefins and diolefins) is less than or equal to 5.0% by weight, preferably less than or equal to 2.0% by weight and preferably less than or equal to 0.1% by weight.

The contents are given as relative weight concentrations, weight percentages (%), parts per million (ppm) by weight or parts per billion (ppb) by weight, relative to the total weight of the stream under consideration.

The process according to the invention thus makes it possible to treat together the plastics pyrolysis oils and the feedstocks derived from renewable sources to obtain an effluent which may be totally or partly injected into a steam cracking unit.

Steam Cracking Step f) (Optional)

The hydrocarbon-based effluent obtained from the separation step d), or at least one of the two liquid hydrocarbon-based streams obtained from the optional step e), may be totally or partly sent to a steam cracking step f).

Advantageously, the gas fraction(s) obtained from the separation step d) and/or the fractionation step e) and containing ethane, propane and butane, may also be totally or partly sent to the steam cracking step f).

Said steam cracking step f) is advantageously performed in at least one pyrolysis furnace at a temperature of between 700 and 900° C., preferably between 750 and 850° C., and at a pressure of between 0.05 and 0.3 MPa relative. The residence time of the hydrocarbon-based compounds is generally less than or equal to 1.0 second (noted as s), preferably between 0.1 and 0.5 s. Steam is advantageously introduced upstream of the optional steam cracking step f) and after the separation (or the fractionation). The amount of water introduced, advantageously in the form of steam, is advantageously between 0.3 and 3.0 kg of water per kg of hydrocarbon-based compounds entering step f). The optional step f) is preferably performed in a plurality of pyrolysis furnaces in parallel, so as to adapt the operating conditions to the various streams feeding step f) and notably obtained from step e), and also to manage the tube decoking times. A furnace comprises one or more tubes arranged in parallel. A furnace may also denote a group of furnaces operating in parallel. For example, a furnace may be dedicated to the cracking of the naphtha cut comprising compounds with a boiling point of less than or equal to 175° C.

The effluents from the various steam cracking furnaces are generally recombined before separation so as to constitute an effluent. It is understood that the steam cracking step f) includes the steam cracking furnaces but also the substeps associated with the steam cracking that are well known to those skilled in the art. These substeps may notably include heat exchangers, columns and catalytic reactors and recycling into the furnaces. A column generally makes it possible to fractionate the effluent for the purpose of recovering at least one light fraction comprising hydrogen and compounds containing 2 to 5 carbon atoms, and a fraction comprising pyrolysis gasoline, and optionally a fraction comprising pyrolysis oil. Columns make it possible to separate the various constituents of the fractionation light fraction so as to recover at least one cut rich in ethylene (C2 cut) and a cut rich in propylene (C3 cut) and optionally a cut rich in butenes (C4 cut). The catalytic reactors notably make it possible to perform hydrogenations of the C2, C3 or even C4 cuts and of the pyrolysis gasoline. The saturated compounds, notably the saturated compounds containing 2 to 4 carbon atoms, are advantageously recycled into the steam cracking furnaces so as to increase the overall yields of olefins.

This steam cracking step f) makes it possible to obtain at least one effluent containing olefins comprising 2, 3 and/or 4 carbon atoms (i.e. C2, C3 and/or C4 olefins), in satisfactory contents, in particular greater than or equal to 30% by weight, notably greater than or equal to 40% by weight, or even greater than or equal to 50% by weight of total olefins comprising 2, 3 and 4 carbon atoms relative to the weight of the steam cracking effluent under consideration. Said C2, C3 and C4 olefins may then be advantageously used as polyolefin monomers.

According to one preferred embodiment of the invention, the process for treating a feedstock comprising a plastics pyrolysis oil and a feedstock derived from renewable sources comprises, preferably consists of, the sequence of the steps as follows, and preferably in the order given:

b) of hydrodemetallization, c) of hydrotreatment, d) of separation or b) of hydrodemetallization, c) of hydrotreatment, d) of separation, e) of fractionation or b) of hydrodemetallization, c) of hydrotreatment, d) of separation, e) of fractionation and recycling of the cut comprising compounds with a boiling point of less than or equal to 175° C. to the hydrotreatment step c)

so as to produce an effluent, at least a part of which is compatible for treatment in a steam cracking unit.

According to another preferred embodiment of the invention, the process for treating a feedstock comprising a pyrolysis oil comprises, preferably consists of, the sequence of the steps as follows, and preferably in the order given:

b) of hydrodemetallization, c) of hydrotreatment, c') of hydrocracking, d) of separation or b) of hydrodemetallization, c) of hydrotreatment, c') of hydrocracking, d) of separation, e) of fractionation or b) of hydrodemetallization, c) of hydrotreatment, c') of hydrocracking, d) all separation, e) of fractionation and recycling of the cut comprising compounds with a boiling point of greater than 175° C. to the hydrocracking step c') and recycling of the cut comprising compounds with a boiling point of less than or equal to 175° C. to the hydrotreatment step c)

so as to produce an effluent, at least a part of which is compatible for treatment in a steam cracking unit.

All the embodiments can comprise, and preferably consist of, in addition, a pretreatment step a0).

All the embodiments can comprise, and preferably consist of, in addition, a selective hydrogenation step a).

All the embodiments can comprise, and preferably consist of, in addition, a steam cracking step f).

Analysis Methods Used

The analysis methods and/or standards used for determining the characteristics of the various streams, in particular of the feedstock to be treated and of the effluents, are known to those skilled in the art. They are in particular listed below by way of information. Other reputed equivalent methods can also be used, notably equivalent IP, EN or ISO methods:

TABLE 1

| Description | Methods |
| --- | --- |
| Density @15° C. | ASTM D4052 |
| Sulfur Content | ISO 20846 |
| Nitrogen Content | ASTM D4629 |
| Acid number | ASTM D664 |
| Bromine Number | ASTM D1159 |
| Diolefin content based on the Maleic anhydride value | MAV method (1) |
| Oxygenated molecule content | Combustion + Infrared |
| Paraffin Content | UOP990-11 |
| Naphthene and Olefin Content | UOP990-11 |
| Aromatics Content | UOP990-11 |
| Halogen Content | ASTM D7359 |
| Chloride Content | ASTM D7536 |
| Metal Content: P Fe Si Na B | ASTM D5185 |
| Simulated distillation | ASTM D2887 |

(1) MAV method described in the article: C. López-García et al., Near Infrared Monitoring of Low Conjugated Diolefins Content in Hydrotreated FCC Gasoline Streams, Oil & Gas Science and Technology - Rev. IFP, Vol. 62 (2007), No. 1, pp. 57-68

BRIEF DESCRIPTION OF THE DRAWINGS

The information regarding the elements referenced in FIGS. 1 to 2 enables a better understanding of the invention, without said invention being limited to the particular embodiments illustrated in FIGS. 1 to 2. The various embodiments presented may be used alone or in combination with each other, without any limitation to the combination.

Figure 1:
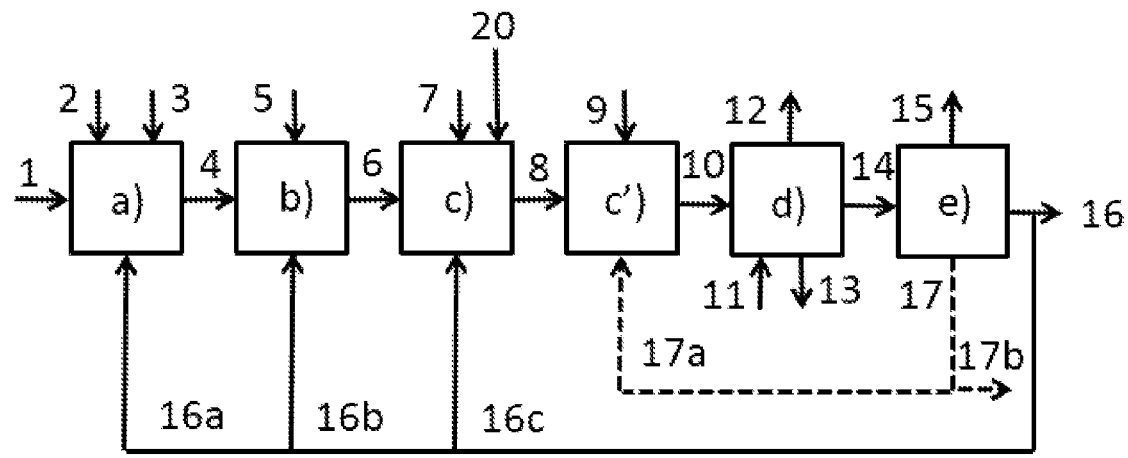
FIG. 1 represents the scheme of a particular embodiment of the process of the present invention, comprising.

an optional step a) of selective hydrogenation of a feedstock comprising a plastics pyrolysis oil 1, in the presence of a hydrogen-rich gas 2 and optionally of an amine supplied by the stream 3, performed in at least one fixed bed reactor including at least one selective hydrogenation catalyst, to obtain an effluent 4;

a step b) of hydrodemetallization of the effluent 4 obtained from step a), in the presence of hydrogen 5, performed in at least one fixed bed reactor comprising at least one hydrodemetallization catalyst, to obtain a demetallized effluent 6;

a step c) of hydrotreatment of at least a part of the effluent obtained from step b), in the presence of hydrogen 7, performed in at least one fixed bed reactor comprising at least one hydrotreatment catalyst, to obtain a hydrotreated effluent 8;

and in which a feedstock derived from renewable sources 20 is introduced in the hydrotreatment step c) (this feedstock can also be partly or totally introduced in steps a) and/or b) (not represented));

optionally a step c') of hydrocracking of at least a part of the effluent 8 obtained from step c), in the presence of hydrogen 9, performed in at least one fixed bed reactor comprising at least one hydrocracking catalyst, to obtain a hydrotreated effluent 10;

a step d) of separation of the effluent 10 performed in the presence of an aqueous washing solution 11, making it possible to obtain at least one fraction 12 comprising hydrogen, an aqueous fraction 13 containing dissolved salts, and a hydrocarbon-based liquid fraction 14;

optionally a step d) of fractionation of the hydrocarbon-based liquid fraction 14, making it possible to obtain at least one gas fraction 15, a hydrocarbon cut 16 comprising compounds with a boiling point of less than or equal to 175° C. and a hydrocarbon cut 17 comprising compounds with a boiling point of greater than 175° C.

At the end of step d) or e), at least a part of the hydrotreated hydrocarbon-based liquid effluent 16 is sent to a steam cracking process (not represented).

Optionally, a part of said hydrocarbon cut 16 comprising compounds with a boiling point of less than or equal to 175° C. constitutes a recycle stream 16a and/or 16b and/or 16c which feeds steps a) and/or b) and/or c) respectively.

Optionally, a part of the cut 17 comprising compounds with a boiling point of greater than 175° C. feeds the hydrocracking step c') (fraction 17a), another part 17b constitutes the purge.

Figure 2:
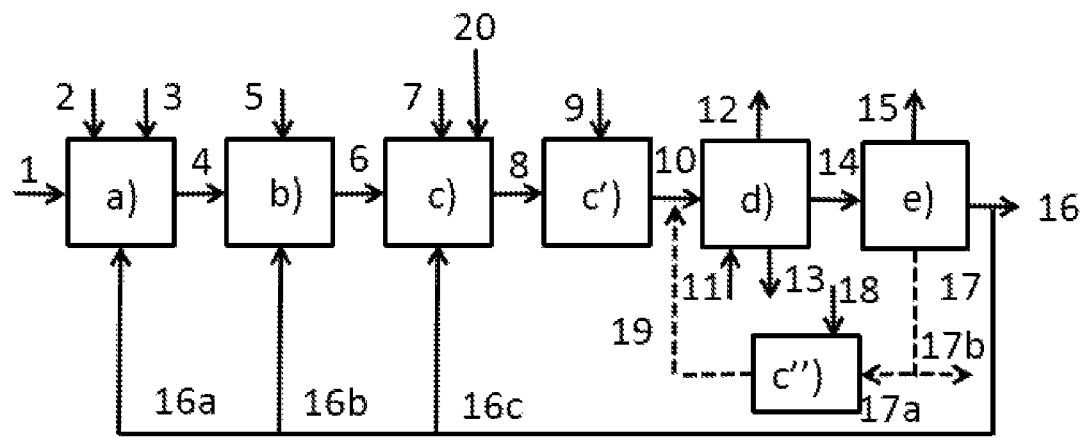

FIG. 2 represents the scheme of another particular embodiment of the process of the present invention, which is based on the scheme of FIG. 1. This scheme comprises notably a second hydrocracking step c") in which the cut 17 comprising compounds with a boiling point of greater than 175° C. obtained from step e) feeds this second hydrocracking step c") (fraction 17a) which is carried out in at least one fixed bed reactor comprising at least one hydrocracking catalyst and is fed with hydrogen 18. The second hydrocracked effluent 19 is recycled to the separation step d). The other part of the cut 17 constitutes the purge 17b.

Instead of injecting the amine stream 3 at the inlet of the selective hydrogenation step a), it is possible to inject it at the inlet of steps b), c), c') and d) or else not to inject it, depending on the characteristics of the feedstock.

Only the main steps, with the main streams, are shown in FIGS. 1 to 2, so as to allow a better understanding of the invention. It is clearly understood that all the equipment required for the functioning is present (vessels, pumps, exchangers, furnaces, columns, etc.), even if it is not shown. It is also understood that hydrogen-rich gas streams (supply or recycle), as described above, may be injected into the inlet of each reactor or catalytic bed or between two reactors or two catalytic beds. Means well known to those skilled in the art for purifying and for recycling hydrogen may also be used.

EXAMPLES

Example 1 (in Accordance with the Invention)

The feedstock 1 treated in the process is a plastics pyrolysis oil. The feedstock 2 treated in the process is a feedstock derived from a renewable source (a rapeseed oil). The plastics pyrolysis oil is fed into the hydrodemetallization step b). The rapeseed oil is fed into the hydrotreatment step c). The characteristics of said feedstocks are indicated in Table 2.

TABLE 2 feedstock characteristics

| Description | Methods | Unit | Feedstock 1 Plastics pyrolysis oil | Feedstock 2 Rapeseed oil |
|---|---|---|---|---|
| Density @15° C. | ASTM D4052 | g/cm³ | 0.7982 | 0.9201 |
| Sulfur content | ISO 20846 | ppm poids | 71 | 4 |
| Nitrogen content | ASTM D4629 | ppm by weight | 871 | 18.4 |
| Bromine content | ASTM D1159 | g/100 g | 50 | 18.4 |
| Oxygenated molecule content | Combustion + Infrared | % by weight | 0.46 | 11 |
| Chloride Content | ASTM D7536 | ppm by weight | 95 | 0 |
| Metal content: | ASTM D5185 | | | |
| Iron | | | 2 | <0.5 |
| P | | ppm by weight | 6.27 | 10 |
| Si | | ppm by weight | 22 | 0 |
| Simulated Distillation | ASTM D2887 | | | |
| 0% | | ° C. | 60.0 | 319.5 |
| 10% | | ° C. | 133.7 | 570.7 |
| 30% | | ° C. | 199.1 | 600.9 |
| 50% | | ° C. | 270.5 | 607.0 |
| 70% | | ° C. | 334.7 | 611.7 |
| 90% | | ° C. | 403.4 | 616.0 |
| 100% | | ° C. | 574.5 | 660.6 |

The feedstock 1 is subjected to a hydrodemetallization step b) performed in a fixed bed reactor and in the presence of hydrogen 5 and of a hydrodemetallization catalyst of CoMo-on-alumina type, under the conditions present in Table 3.

TABLE 3 conditions of the hydrodemetallization step b)

| | | |
|---|---|---|
| Hydrodemetallization temperature | ° C. | 300 |
| Partial pressure of hydrogen | MPa abs | 3.1 |
| H₂/HC (volume coverage of hydrogen relative to the feedstock volume) | Nm³/m³ | 300 |
| HSV (volume flow rate of feedstock/volume of catalysts) | h⁻¹ | 1 |

The characteristics of the effluent obtained from the hydrodemetallization step b) (which correspond to the liquid effluent 6) are presented in Table 4:

TABLE 4 characteristics of the effluent obtained from the hydrodemetallization step b)

| Description | Methods | Unit | Effluent obtained from step b) (6) |
|---|---|---|---|
| Density @15° C. | ASTM D4052 | g/cm³ | 0.7921 |
| Sulfur Content | ASTM D5453 | ppm by weight | 37.8 |
| Nitrogen content | ASTM D4629 | ppm by weight | 586.3 |
| Bromine content | ASTM D1159 | g/100 g | 20.13 |
| Oxygenated molecule content | Combustion + Infrared | % by weight | 0 |
| Chloride Content | ASTM D7536 | ppm by weight | 4.7 |
| Metal content: | ASTM D5185 | | |
| Iron | | ppm by weight | 1.4 |
| P | | ppm by weight | 1.4 |
| Si | | ppm by weight | <1 |

The effluent 6 obtained from the hydrodemetallization step b) is subjected to a hydrotreatment step c) according to the invention. The feedstock 2 derived from renewable sources 20 is also introduced in the hydrotreatment step c). The feedstock fed at the hydrotreatment step c) is a mixture consisting of 50% by weight of the effluent obtained from the hydrodemetallization of the plastics pyrolysis oil and 50% by weight of a rapeseed oil.

The hydrotreatment step c) is performed in a fixed bed reactor and in the presence of hydrogen 7 and of a hydrotreatment catalyst of NiMo-on-alumina type, under the conditions present in Table 5.

TABLE 5 conditions of the hydrotreatment step c)

| | | |
|---|---|---|
| Hydrotreatment temperature | ° C. | 310 |
| Partial pressure of hydrogen | MPa abs | 5.1 |
| H₂/HC (volume coverage of hydrogen relative to the feedstock volume) | Nm³/m³ | 700 |
| HSV (volume flow rate of feedstock/volume of catalysts) | h⁻¹ | 0.5 |

The effluent 8 obtained from the hydrotreatment step c) is subjected to a separation step d) according to the invention in which a stream of water 11 is injected into the effluent obtained from the hydrotreatment step c); the mixture is then sent into the separation step d) and is treated in a column for washing the acidic gases. A gas fraction is obtained at the top of the acidic gas washing column whereas, at the bottom, a two-phase separating vessel makes it possible to separate an aqueous phase and a liquid phase. The gas washing column and the two-phase separator are operated at high pressure. The liquid phase is then sent into a low-pressure vessel so as to recover a second gas fraction, which is purged, and a liquid effluent. The yields for the various products and for the various fractions obtained at the outlet of the hydrotreatment step c) are indicated in Table 6 (the yields corresponding to the ratios of the weight amounts of the various products obtained relative to the weight of feedstock, expressed as percentage and noted as % w/w).

TABLE 6 yields for the various products and fractions obtained at the outlet of the hydrotreatment step c)

| | | |
|---|---|---|
| $H_2S$—$NH_3$ | % m/m | 0.1 |
| CO | % m/m | 0.1 |
| $CO_2$ | % m/m | 0.6 |
| $H_2O$ [%] | % m/m | 4.0 |
| $C_1$-$C_4$ | % m/m | 2.7 |
| PI –180° C. Fraction | % m/m | 11.8 |
| 180° C.+ Fraction | % m/m | 82.8 |
| Total | % m/m | 102.0 |

The characteristics of the effluent obtained from the separation step d) (which correspond to the liquid effluent 14) are presented in Table 7:

TABLE 7 characteristics of the effluent 14 obtained from the separation step d)

| Description | Methods | Unit | Effluent (14) |
|---|---|---|---|
| Density @15° C. | ASTM D4052 | g/cm3 | 0.7908 |
| Sulfur Content | ASTM D5453 | ppm by weight | 4.5 |
| Nitrogen Content | ASTM D4629 | ppm by weight | 2.2 |
| Bromine content | ASTM D1159 | g/100 g | <0.8 |
| Oxygenated molecule content | Combustion + Infrared | % by weight | <0.1 |
| Chloride Content | ASTM D7536 | ppm by weight | Not detected |
| Iron content | ASTM D5185 | ppb by weight | Not detected |
| Total metal content | | ppm by weight | Not detected |

The hydrocarbon-based effluent 14 obtained from the separation step d) has a composition compatible with a steam cracking unit since:
  it does not contain any olefins (monoolefins and diolefins);
  it does not contain any chlorine (content not detected and below the limit required for a steam cracking feedstock);
  it does not contain any iron (Fe) or any metals (content of metals not detected and below the limits required for a steam cracking feedstock, i.e. ≤5.0 ppm by weight and very preferably ≤1 ppm by weight for metals; and also ≤100 ppb by weight for Fe);
  finally, it contains little sulfur (5.5 ppm by weight) and little nitrogen (1.8 ppm by weight), these contents being very much lower than the limits required for a steam cracking feedstock (≤500 ppm by weight, preferably ≤200 ppm by weight for S and N).

The effluent 14 obtained from the separation step d) consists of approximately 11.8% of compounds of naphtha type with a boiling point of less than or equal to 180° C.

The effluent 14 can be sent directly to a steam cracking step f).

The invention claimed is:

1. A process for treating a feedstock comprising a plastics pyrolysis oil and a feedstock derived from renewable sources, the process comprising:
  a) optionally, performing a selective hydrogenation in a reaction section fed with a feedstock comprising a plastics pyrolysis oil and a gas stream comprising hydrogen, in the presence of at least one selective hydrogenation catalyst, at a temperature of between 80 and 280° C., a partial pressure of hydrogen of between 1.0 and 20.0 MPa abs., and an hourly space velocity of between 0.3 and 10.0 $h^{-1}$, to obtain a hydrogenated effluent,
  b) performing a hydrodemetallization in a hydrodemetallization reaction section comprising at least one hydrodemetallization catalyst, said hydrodemetallization reaction section being fed with the feedstock comprising a plastics pyrolysis oil and/or the hydrogenated effluent obtained from a), and a gas stream comprising hydrogen, said hydrodemetallization being performed at an average temperature of between 14° and 400° C., a partial pressure of hydrogen of between 1.0 and 20.0 Mpa abs., and an hourly space velocity of between 0.1 and 10.0 $h^{-1}$, to obtain a demetallized effluent,
  c) performing a hydrotreatment in a hydrotreatment reaction section comprising at least one hydrotreatment catalyst, said hydrotreatment reaction section being fed at least with said demetallized effluent obtained from b) and a gas stream comprising hydrogen, said hydrotreatment being performed at a temperature of between 250 and 450° C., a partial pressure of hydrogen of between 1.0 and 10.0 MPa abs., and an hourly space velocity of between 0.1 and 10.0 $h^{-1}$,
    wherein said hydrotreatment reaction section is also fed with said feedstock derived from renewable sources, wherein a weight ratio between flow rate of the demetallized effluent and flow rate of feedstock derived from renewable sources introduced is between 0.05 and 20, and
    said hydrotreatment reaction section comprising at least one fixed bed reactor containing n catalytic beds, n being between 2 and 5, the demetallized effluent obtained from step b) being introduced at the top of said hydrotreatment reaction section, whereas the feedstock derived from renewable resources is injected in stages at an inlet of each catalytic bed in increasing proportions,
  c') optionally, performing hydrocracking in a hydrocracking reaction section comprising at least one hydrocracking catalyst, said hydrocracking reaction section being fed at least with said hydrotreated effluent obtained from c) and/or with a cut comprising compounds having a boiling point greater than 175° C. obtained from e) and a gas stream comprising hydrogen, said hydrocracking reaction section being performed at an average temperature of between 25° and 450° C., a partial pressure of hydrogen of between 1.5 and 20.0 MPa abs., and an hourly space velocity of between 0.1 and 10.0 $h^{-1}$, to obtain a hydrocracked effluent which is sent into separation step d),
  d) performing a washing/separation, wherein the washing/separation is fed with the hydrotreated effluent obtained from c) and/or with the hydrocracked effluent obtained from c') and an aqueous solution wherein the aqueous solution is injected into the hydrotreated effluent obtained from c) or the hydrocracked effluent obtained from the c') upstream of the washing/separation, said washing/separation being performed at a temperature of between 5° and 450° C., to obtain at least one gaseous effluent, an aqueous effluent, and a hydrocarbon-based effluent, and e) optionally fractionating all or a part of the hydrocarbon-based effluent obtained from d) to obtain at least one further gaseous effluent, at least one cut comprising compounds with a boiling point of less than or equal to 175° C., and one hydrocarbon cut comprising compounds with a boiling point of greater than 175° C.

2. The process according to claim 1, wherein the process includes fractionation e).

3. The process according to claim 1, wherein the process includes the hydrocracking c').

4. The process according to claim 1, wherein the process includes said selective hydrogenation a).

5. The process according to claim 1, wherein the feedstock derived from renewable sources is a feedstock comprising an oil and/or fat of plant and/or animal origin.

6. The process according to claim 1, wherein the temperature of the reaction section of c) is higher than the temperature of the hydrodemetallization reaction section of b).

7. The process according to claim 1, wherein at least one fraction of the hydrocarbon-based effluent obtained from the separation d) or at least one fraction of the cut comprising compounds with a boiling point of less than or equal to 175° C. obtained from fractionation e) is sent, as a recycle stream, to the selective hydrogenation a) and/or the hydrodemetallization b) and/or the hydrotreatment c).

8. The process according to claim 1, wherein at least one fraction of the cut comprising compounds with a boiling point of greater than 175° C. obtained from fractionation e) is sent, as a recycle stream, to the hydrodemetallization b) and/or the hydrotreatment c) and/or the hydrocracking c').

9. The process according to claim 7, wherein the at least one fraction of the hydrocarbon-based effluent obtained from the separation d) or at least one fraction of the cut comprising compounds with a boiling point of less than or equal to 175° C. obtained from fractionation e) is sent, as a recycle stream, to the hydrotreatment c), and a weight ratio between (a) the recycle stream and (b) the feedstock comprising a plastics pyrolysis oil and the feedstock derived from renewable sources is less than or equal to 10.

10. The process according to claim 9, wherein the weight ratio between (a) the recycle stream and (b) the feedstock comprising a plastics pyrolysis oil and the feedstock derived from renewable sources is less than or equal to 5.

11. The process according to claim 9, wherein the weight ratio between (a) the recycle stream and (b) the feedstock comprising a plastics pyrolysis oil and the feedstock derived from renewable sources is between 0.2 and 5.

12. The process according to claim 1, further comprising a0) pretreatment of the feedstock comprising a plastics pyrolysis oil and/or the feedstock derived from renewable resource, said pretreatment being carried out upstream of the selective hydrogenation a) and comprising a filtration step and/or an electrostatic separation and/or a washing by means of an aqueous solution and/or an adsorption.

13. The process according to claim 1, wherein the hydrocarbon-based effluent obtained from the separation d), or at least one of the two cuts obtained from e), is totally or partly sent to a steam cracking f) performed in at least one pyrolysis furnace at a temperature of between 700 and 900° C. and at a pressure of between 0.05 and 0.3 MPa relative.

14. The process according to claim 1, wherein said selective hydrogenation catalyst comprises a support chosen from alumina, silica, silica-aluminas, magnesia, clays, and mixtures thereof, and a hydro-dehydrogenating function comprising either at least one group VIII element and at least one group VIB element, or at least one group VIII element.

15. The process according to claim 1, wherein said hydrodemetallization catalyst comprises a support chosen from the group consisting of alumina, silica, silica-aluminas, magnesia, clays and mixtures thereof, and a hydro-dehydrogenating function comprising at least one group VIII element and/or at least one group VIB element.

16. The process according to claim 1, further comprising a second hydrocracking c") performed in a hydrocracking reaction section comprising at least one hydrocracking catalyst, said hydrocracking reaction section being fed with the cut comprising compounds having a boiling point greater than 175° C. obtained from e) and a gas stream comprising hydrogen, said hydrocracking reaction section being used at a temperature of between 250 and 450° C., a partial pressure of hydrogen of between 1.5 and 20.0 MPa abs., and an hourly space velocity of between 0.1 and 10.0 $h^{-1}$, to obtain a hydrocracked effluent which is sent into the separation d).

17. The process according to claim 1, wherein said hydrocracking catalyst comprises a support chosen from halogenated aluminas, combinations of boron and aluminum oxides, amorphous silica-aluminas and zeolites, and a hydro-dehydrogenating function comprising at least one group VIB metal chosen from chromium, molybdenum and tungsten, alone or as a mixture, and/or at least one group VIII metal chosen from iron, cobalt, nickel, ruthenium, rhodium, palladium and platinum.

18. The process according to claim 1, wherein the feedstock has the following properties:
  a content of aromatic compounds of between 0 and 90% by weight,
  a content of halogenated compounds of between 2 and 5000 ppm by weight,
  a content of metallic elements of between 10 and 10 000 ppm by weight,
  a content of iron element of between 0 and 100 ppm by weight, and
  a content of silicon element of between 0 and 1000 ppm by weight.

19. The process according to claim 1, wherein the weight ratio between the flow rate of the feedstock comprising a plastics pyrolysis oil and the flow rate of feedstock derived from renewable sources is between 0.1 and 10.

* * * * *